US011330556B2

(12) United States Patent
Kumar et al.

(10) Patent No.: US 11,330,556 B2
(45) Date of Patent: May 10, 2022

(54) PERSISTENT PAGING OCCASION COLLISION AVOIDANCE FOR MULTI-SIM USER EQUIPMENTS

(71) Applicant: QUALCOMM Incorporated, San Diego, CA (US)

(72) Inventors: Rajeev Kumar, Bangalore (IN); Pavan Kaivaram, Hyderabad (IN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/911,272

(22) Filed: Jun. 24, 2020

(65) Prior Publication Data

US 2021/0022111 A1 Jan. 21, 2021

Related U.S. Application Data

(60) Provisional application No. 62/875,916, filed on Jul. 18, 2019.

(51) Int. Cl.
*H04W 68/02* (2009.01)
*H04W 8/24* (2009.01)
(Continued)

(52) U.S. Cl.
CPC ............ *H04W 68/02* (2013.01); *H04W 8/24* (2013.01); *H04W 52/0216* (2013.01); *H04W 88/06* (2013.01)

(58) Field of Classification Search
CPC .... H04W 68/02; H04W 8/24; H04W 52/0216
(Continued)

(56) References Cited

U.S. PATENT DOCUMENTS

2012/0115485 A1* 5/2012 Narasimha ............ H04W 68/02
455/437
2013/0303203 A1* 11/2013 Wang .................... H04W 68/00
455/458
(Continued)

FOREIGN PATENT DOCUMENTS

EP          2680662 A1    1/2014
WO    2017165126 A1    9/2017

OTHER PUBLICATIONS

Partial International Search Report—PCT/US2020/039655—ISA/EPO—dated Sep. 25, 2020.
(Continued)

*Primary Examiner* — Joel Ajayi
(74) *Attorney, Agent, or Firm* — Arent Fox, LLP

(57) ABSTRACT

Aspects described herein provide designs to reduce the probability of persistent PF/PO conflicts of different subscriptions for a multi-SIM/USIM UE. A base station may be configured to determine a first conflict avoidance PO based on one or more modified parameters associated with the first conflict avoidance PO. The base station may be further configured to transmit a first paging message in the first conflict avoidance PO in a first DRX cycle. A UE may be configured to receive the one or more modified parameters in SIB. The UE may be configured to determine the first conflict avoidance PO based on the one or more modified parameters. The UE may be further configured to receive the first paging message in the first conflict avoidance PO in the first DRX cycle.

25 Claims, 13 Drawing Sheets

(51) Int. Cl.
*H04W 52/02* (2009.01)
*H04W 88/06* (2009.01)

(58) Field of Classification Search
USPC .......................................... 455/458
See application file for complete search history.

(56) References Cited

U.S. PATENT DOCUMENTS

2013/0308533 A1* 11/2013 Murakami ........ H04W 52/0216
370/328
2014/0073366 A1  3/2014 Xing et al.

OTHER PUBLICATIONS

VIVO: "Vivo Views on NR Rel-17", 3GPP Draft; RP-190833, 3GPP TSG RAN Meeting #84, Vivo Views on REL-17, 3rd Generation Partnership Project (3GPP), Mobile Competence Centre, 650, Route Des Lucioles, F-06921 Sophia-Antipolis Cedex, France, vol. TSG RAN, No. Newport Beach, USA, Jun. 3, 2019-Jun. 6, 2019, May 27, 2019 (May 27, 2019), XP051739154,22 Pages, Retrieved from the Internet: URL: http://www.3gpp.org/ftp/tsg%5Fran/TSG%5FRAN/TSGR%5F84/Docs/RP%2D190833%2Ezip [retrieved on May 27, 2019] The Whole Document.
International Search Report and Written Opinion—PCT/US2020/039655—ISA/EPO—dated Nov. 23, 2020.

* cited by examiner

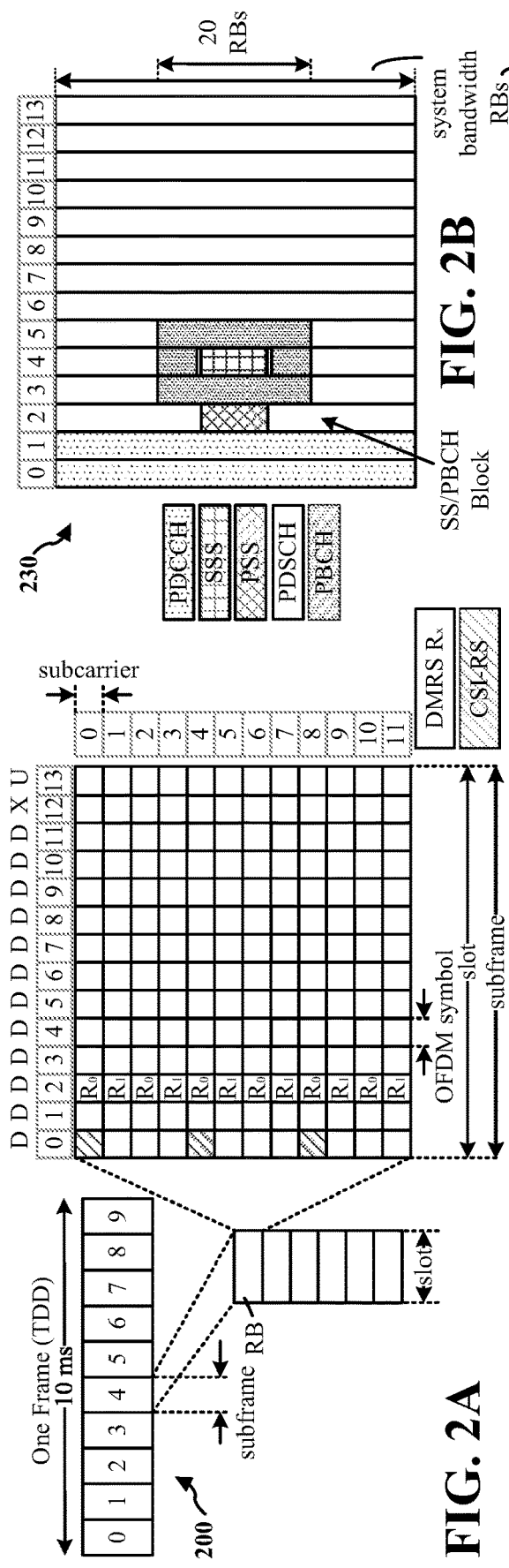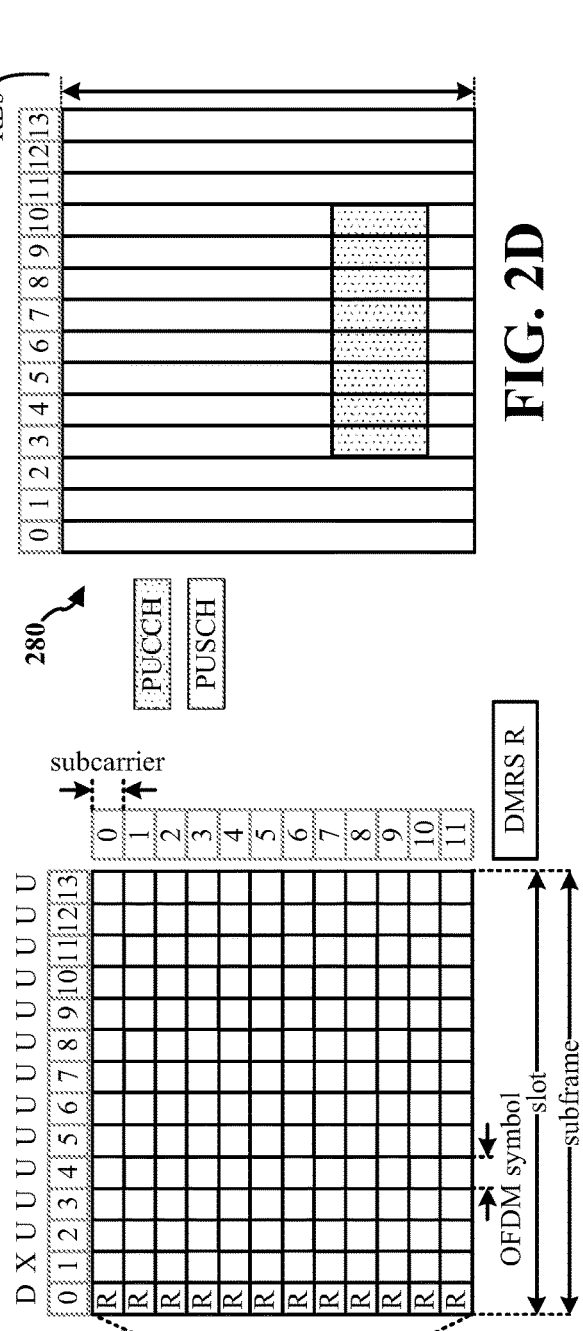

PERSISTENT PAGING OCCASION COLLISION AVOIDANCE FOR MULTI-SIM USER EQUIPMENTS

CROSS REFERENCE TO RELATED APPLICATION(S)

This application claims the benefit of U.S. Provisional Application Ser. No. 62/875,916, entitled "Persistent Paging Occasion Collision Avoidance For Multi-SIM User Equipments" and filed on Jul. 18, 2019, which is expressly incorporated by reference herein in its entirety.

BACKGROUND

Technical Field

The present disclosure relates generally to communication systems, and more particularly, to a user equipment (UE) with a multiple subscriber identity module/universal subscriber identity module (multi-SIM/USIM).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A UE that is registered with an operator network may stay in a discontinuous reception (DRX) mode or idle mode when the UE is not in a state of active data exchange, e.g., a connected mode. In the DRX mode or the idle mode, the UE may periodically monitor a downlink paging channel to attempt to detect a page for the UE from a base station. The periodic occasions may be referred to as a paging occasion (PO). A UE that supports multiple subscriber modules, e.g., a multi-SIM/USIM UE, may monitor a paging frame (PF) and/or PO for each operator network for which the UE is registered. The PO may be determined per subscription. Therefore, the UE may have multiple POs to monitor. The PFs or POs for multiple subscriptions may conflict in time, or overlap in time. The UE may skip one of the conflicting PFs/POs associated with a first subscription in order to monitor for the other conflicting PF/PO for a second subscription. The UE may use algorithms to arbitrate between conflicting PFs/POs to maintain fairness between the different subscriptions. Aspects presented herein provide solutions to reduce the probability of persistent PO collisions.

Described herein are various designs and approaches to address the problems of persistent PF/PO collisions. Aspects described herein include design changes to PF/PO calculation in order to reduce the probability of persistent PF/PO conflicts in multiple subscription scenarios. Aspects described herein may include modified parameters of a PF or PO for the multi-SIM/USIM UE. In this way, the probability of persistent PF/PO collision among multiple registered subscriptions may be reduced. In addition, the variation in paging reception delay in the scenario of PF/PO collision may be minimized. Moreover, the reliability of the paging procedure may be increased without a significant increase in signaling load on the operator network.

In an aspect of the disclosure, a method, a computer-readable medium, and an apparatus are provided. The apparatus may be a wireless device, for example, a base station. The apparatus may be configured to determine a first conflict avoidance PO based on one or more modified parameters associated with the first conflict avoidance PO. The apparatus may be further configured to transmit a first paging message in the first conflict avoidance PO to a UE in a first discontinuous reception (DRX) cycle.

In another aspect of the disclosure, a method, a computer-readable medium, and an apparatus are provided. The apparatus may be a wireless device, for example, a UE. The apparatus may be configured to receive one or more modified parameters associated with a first conflict avoidance PO in a system information block (SIB) from a base station. The apparatus may be configured to determine the first conflict avoidance PO based on the one or more modified parameters. The apparatus may be further configured to receive a first paging message in the first conflict avoidance PO from the base station in a first DRX cycle.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
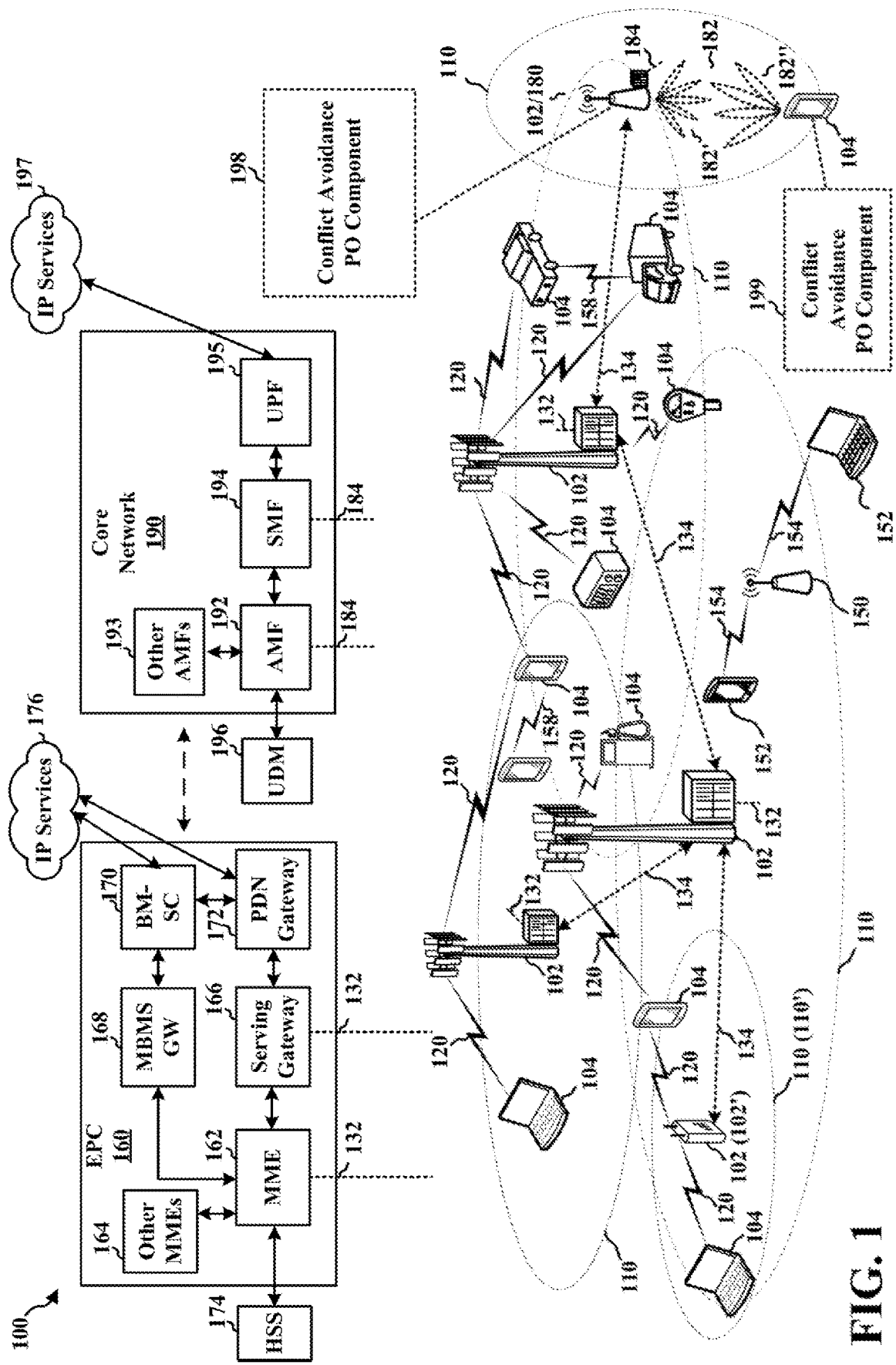
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may comprise a conflict avoidance PO component 198 configured to determine a first conflict avoidance PO based on one or more modified parameters associated with the first conflict avoidance PO. The base station 102/180 may be configured to transmit a first paging message in the first conflict avoidance PO to a UE 104 in a first DRX cycle. In some aspects, the UE 104 may comprise a conflict avoidance PO component 199 configured to receive the one or more modified parameters associated with the first conflict avoidance PO in a SIB from the base station 102/180. The UE 104 may be configured to determine the first conflict avoidance PO based on the one or more modified parameters. The UE 104 may be further configured to receive the first paging message in the first conflict avoidance PO from the base station 102/180 in the first DRX cycle. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
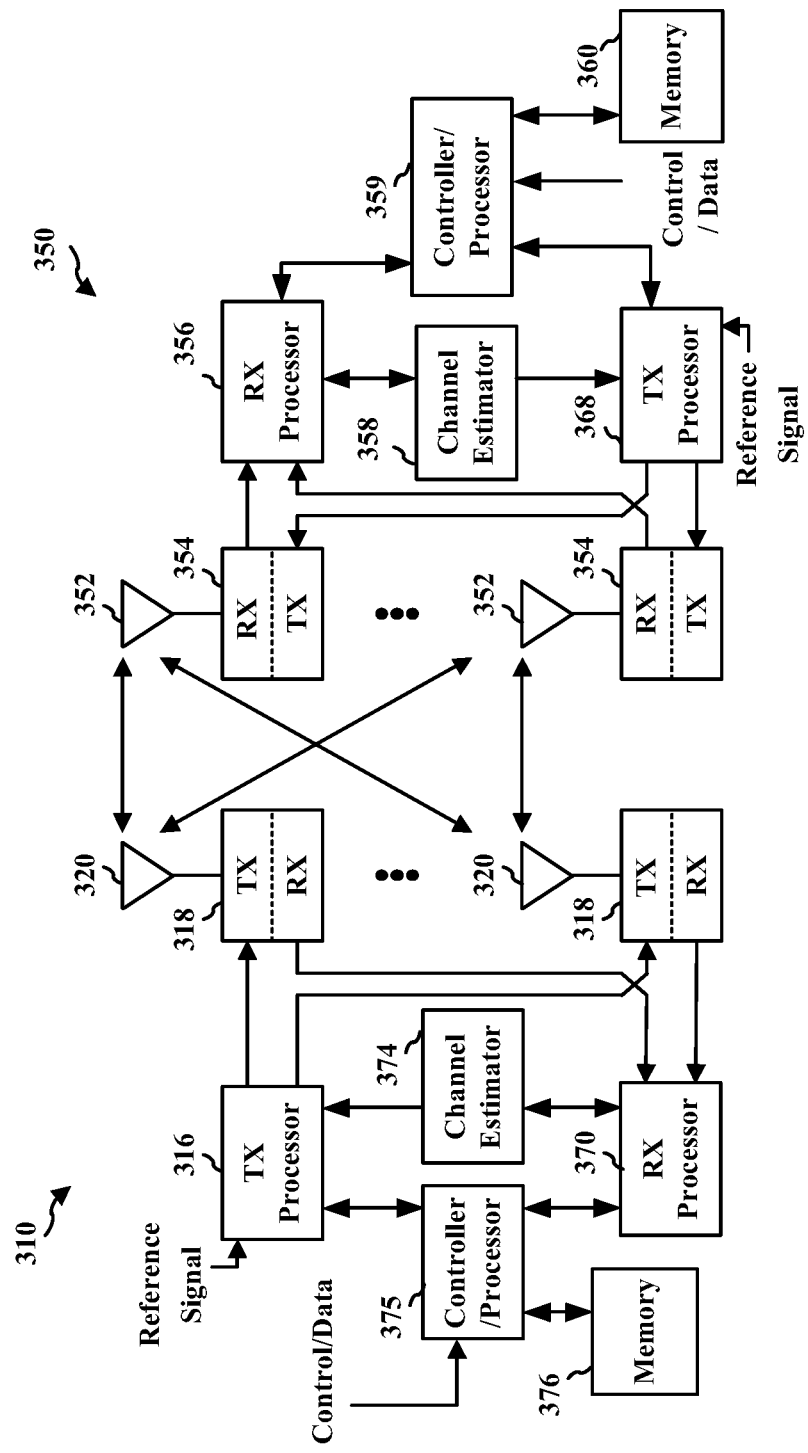
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 316, the RX processor 370, and the controller/processor 375 may be configured to perform aspects in connection with the conflict avoidance PO component 198 of FIG. 1. At least one of the TX processor 368, the RX processor 356, and the controller/processor 359 may be configured to perform aspects in connection with the conflict avoidance PO component 199 of FIG. 1.

A UE that is registered with an operator network may operate in a DRX (e.g., IDLE) mode when the UE is not in a state of active data exchange with the network (e.g., in a CONNECTED mode). In the DRX (IDLE) mode, the UE may periodically listen to, or monitor, a DL paging channel to attempt to detect a paging message for the UE. The monitoring may be based on a DRX cycle that includes periodic occasions for monitoring for a paging message from the network. These periodic occasions where a UE may listen to the paging channel may be called POs. A PF may refer to one radio frame scheduled for paging, which may contain one or multiple POs. The PO/PF for the UE may be determined based on a paging channel configuration (which may be broadcasted by an operator network in SIB) and/or a subscriber identity for the UE (e.g., international mobile subscriber identity (IMSI) or 5G serving temporary mobile subscriber identity (5G-S-TMSI)).

The UE may support multiple subscriber modules. For example, the UE may be configured with multiple SIM/USIM cards. The UE may have multiple subscriptions with multiple operator networks, each associated with a respective SIM. The UE that supports multiple subscriber modules may be referred to as a multi-SIM/USIM UE. The multi-SIM/USIM UE in a DRX (IDLE) mode may be expected to listen, during a DRX cycle, to paging channels of each operator network on which the UE is registered.

As the POs are derived per subscription, in some scenarios, the POs of different subscriptions or different subscribed operator networks may conflict in time. A conflict in time may refer to an overlap in time of more than one PO. A UE with limited DL receive capability may not be able to simultaneously monitor POs or receive paging messages from more than one operator network. The UE with limited DL receive capability may arbitrate among the conflicting PO subscriptions in order to determine a PO to skip in order to monitor an overlapping PO. Therefore, the UE may tune to only one of the POs and may ignore the other conflicting PO(s). As a result, a paging message or paging information carried on the skipped POs may be lost and not received by the UE. Missing the paging information may cause the UE to wait for a next DRX cycle to receive a retransmission of the paging message or paging information. If the POs of different subscriptions persistently conflict in time, e.g., by repeatedly overlapping, the UE may miss multiple paging messages from the subscribed operator networks.

The PF and the PO may be derived for a subscriber in an operator network in a manner that does not account for the presence of multi-SIM/USIM UEs in the network. UEs with limited DL receive capability that skip POs to listen to the paging messages on other subscribed operator networks may experience degradation of key performance indicators (KPIs) of mobile terminated (MT) call setup, etc.

The present application presents changes to address the problems related to persistent or repeated time conflicts of POs of different subscriptions. The design changes may improve the KPIs of MT call setup, etc., for multi-SIM/USIM UEs. Aspects described herein may include modified parameters associated with PFs and POs for the multi-SIM/USIM UE in the DRX mode, which may mitigate persistent conflicts of PFs and/or POs of different subscriptions. For example, the modified parameters associated with a PF and a PO may be randomized or dynamically shifted from default parameters of a PF and a PO, respectively. In this way, if the UE misses the paging message at a first time, the UE may be less likely to miss a subsequent paging message. Thus, the probability of persistent PF/PO collisions among multiple registered subscriptions may be reduced. By randomizing or shifting the parameters of PO/PF from the default parameters of PO/PF, the variation in paging reception delay due to PF/PO collisions may also be reduced or minimized, e.g., because the probability of the UE failing to receive paging messages on one channel may be reduced. Further, the reliability of the paging procedure may be increased by reducing the amount of lost paging messages. The reliability of the paging procedure may be increased without any significant increase in signaling load on the operator network.

Figure 4:
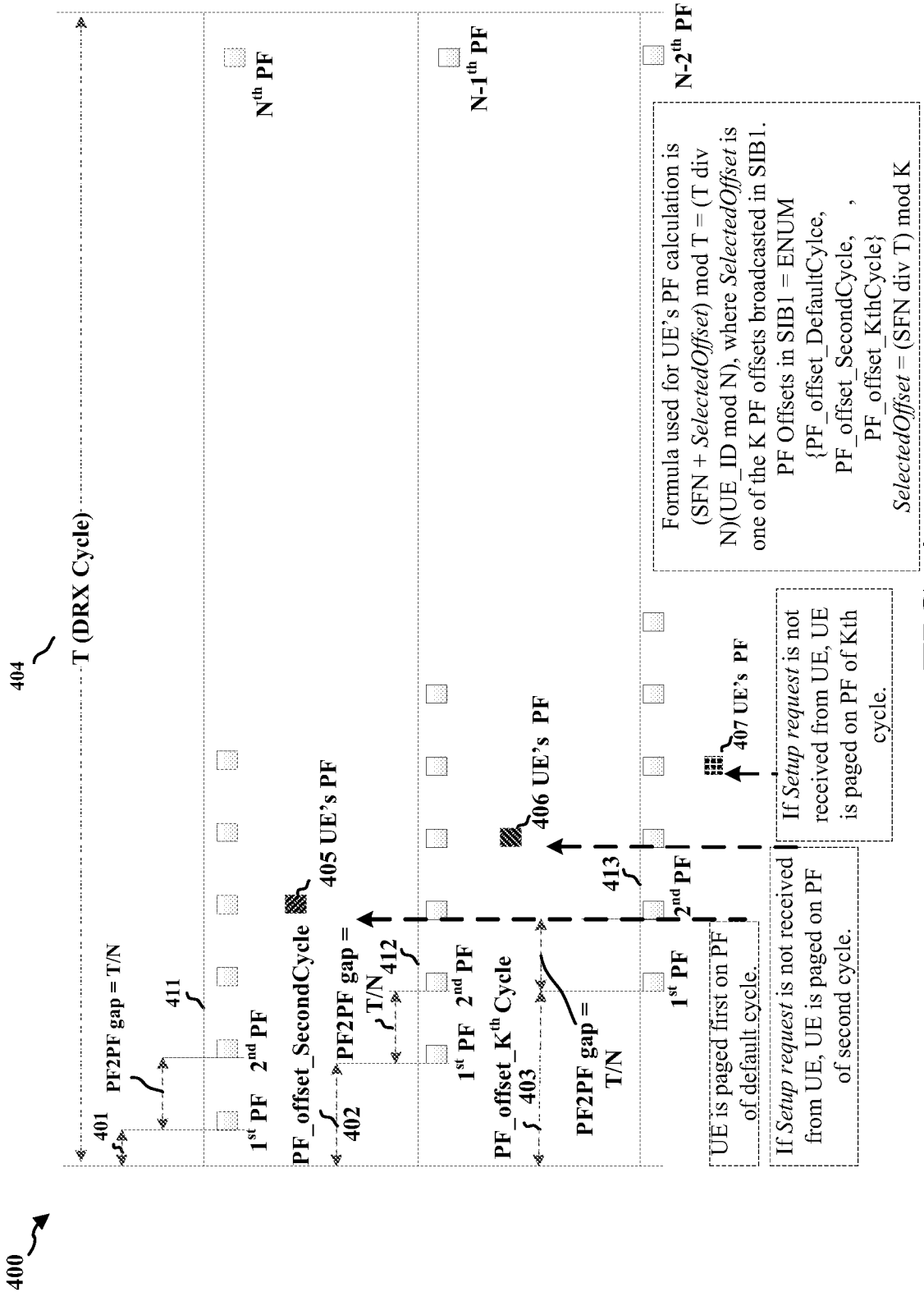
FIG. 4 is a diagram illustrating an example of a design to address the problems of persistent PO collisions for a multi-SIM/USIM UE.

There are various aspects that may address the problems of persistent PO collisions for a multi-SIM/USIM UE. FIG. 4 is a diagram 400 illustrating an example of a design to address the problems of persistent PO collisions for a multi-SIM/USIM UE. In some aspects, a default PF for a multi-SIM/USIM UE may be modified. The default PF for the UE may be determined based on an SFN or a length of a DRX cycle T. For example, the default PF may be determined by:

Default PF=SFN mod T=(T div N)×(UE_ID mod N), where T is a length of a DRX cycle 404 of the UE, and where N is a number of paging frames in a DRX cycle of the UE.

In this design, the default PF for the UE may be modified or shifted. For example, a set of PF offsets (e.g., 401, 402, 403, etc.) for multiple DRX cycles for one cell may be indicated in a SIB (e.g., SIB1). The network may define more than one PF offset in the set of PF offsets (e.g., 401, 402, 403, etc.) in the SIB. The network may define multiple DRX cycles with different PF offsets for the cell. The PFs of the UE may be shifted or modified from the default PF, and different PFs may be selected for different DRX cycles. In this way, if the UE misses a paging message in a PO/PF in a DRX cycle, the UE may be less likely to miss the paging message in a next DRX cycle. Thus, the UE may avoid persistent conflicting POs in the PF with other subscriptions.

As shown in FIG. 4, in a first DRX cycle 411, a base station may select a first PF offset 401 (e.g., Selected Offset) from the set of available PF offsets (K) (e.g., 401, 402, 403, etc.) in the SIB. The UE may be paged at a first PF 405 of the UE. The base station may send a first paging message in the first PF 405 of the UE in the first DRX cycle 411 according to the first PF offset 401.

If the UE receives the first paging message, the UE may respond by sending a setup request message. The UE may not respond to the first paging message in the first PO/PF 405 of the UE because the UE may miss the first paging message, such as when the UE tunes to or monitors a conflicting PO from another subscription and ignores the first PO of the first PF 405. If the setup request message is not received from the UE, the UE may be paged in a second PO of a second PF 406 during a second DRX cycle 412. If the UE does not respond to the first paging message, the base station may repeat the first paging message in a second DRX cycle by selecting a second PF offset 402 from the set of available PF offsets (e.g., 401, 402, 403, etc.) in the SIB. The base station may resend the first paging message in the second PO of the second PF 406 during the second DRX cycle 412 based on the second PF offset 402.

For example, if the setup request message is not received from the UE in the second DRX cycle 412, the UE may be paged on a third PO of a third PF 407 during a third DRX cycle 413. Similarly, if the setup request message is not received from the UE, the base station may page the UE during a subsequent DRX cycle in a corresponding PO/PF, for example, at the Kth PO/PF in a Kth DRX cycle. In some aspects, the base station may use different PF offsets in every DRX cycle. In this way, even if two DRX cycles have a same duration, the UE may be less likely to experience persistent conflicting POs with another subscription at a corresponding time because the PF offsets for the two DRX cycles are different. As the first PF offset 401 and the second PF offset 402 may be shifted or pseudo-randomized, if the UE misses the first paging message during the first DRX cycle 411, the UE may avoid repeatedly missing the first paging message during one or more subsequent DRX cycles (e.g., 412, 413). Thus, the UE may avoid missing the first paging message at a same corresponding time in the first DRX cycle 411 and the subsequent DRX cycle (e.g., 412, 413). Therefore, the probability of persistent conflicting POs may be reduced or minimized.

For example, the PF offsets may be separated by a pseudo-randomly selected number of radio frames. As an example, the offsets may be at least a prime number (3, 5, 7, 11, 13, 17) of radio frames apart.

For example, the PF of the UE may be determined based on the SFN, the selected PF offset, the length of the DRX cycle, or any combination thereof. As an example, the PF of the UE may be determined by:

(SFN+SelectedOffset) mod T=(T div N)(UE_ID mod N), where SelectedOffset is one of the set of PF offsets (e.g., 401, 402, 403, etc.) broadcasted in SIB (e.g., SIB1).

For example, the set of PF offsets broadcasted in the SIB (e.g., SIB1) may be: PF Offsets in SIB1=ENUM {PF_offset_DefaultCylce, PF_offset_SecondCycle, . . . , PF_offset_KthCycle} As an example, PF_offset_DefaultCylce may be the first PF offset 401 for the first DRX cycle 411, PF_offset_SecondCycle may be the second PF offset 402 for the second DRX cycle 412, and so on.

The selected PF offset may be based on at least one of an SFN, a length of the DRX cycle, a quantity of the set of PF offsets, or any combination thereof. As an example, the selected PF offset for the Kth DRX cycle may be determined by:

SelectedOffset=(SFN div T) mod K, where T is a length of a DRX cycle, and K is the quantity of PF offsets broadcasted in SIB1. The number of PF offsets can be one or more. For example, the SFN may increment by 1 in every radio frame (10 ms). Thus, the selected PF offset may map to a different value in every DRX cycle.

There may be many ways for the base station to shift the PF of the UE from the default PF or pseudo-randomly select the PF offset of the UE for a corresponding DRX cycle. The above examples are merely for illustration, not for limiting the scope of the present disclosure.

The base station may determine a number of times to resend the first paging message to the UE. The number of times to resend the first paging message to the UE may be an implementation choice (e.g., at the base station).

Figure 5:
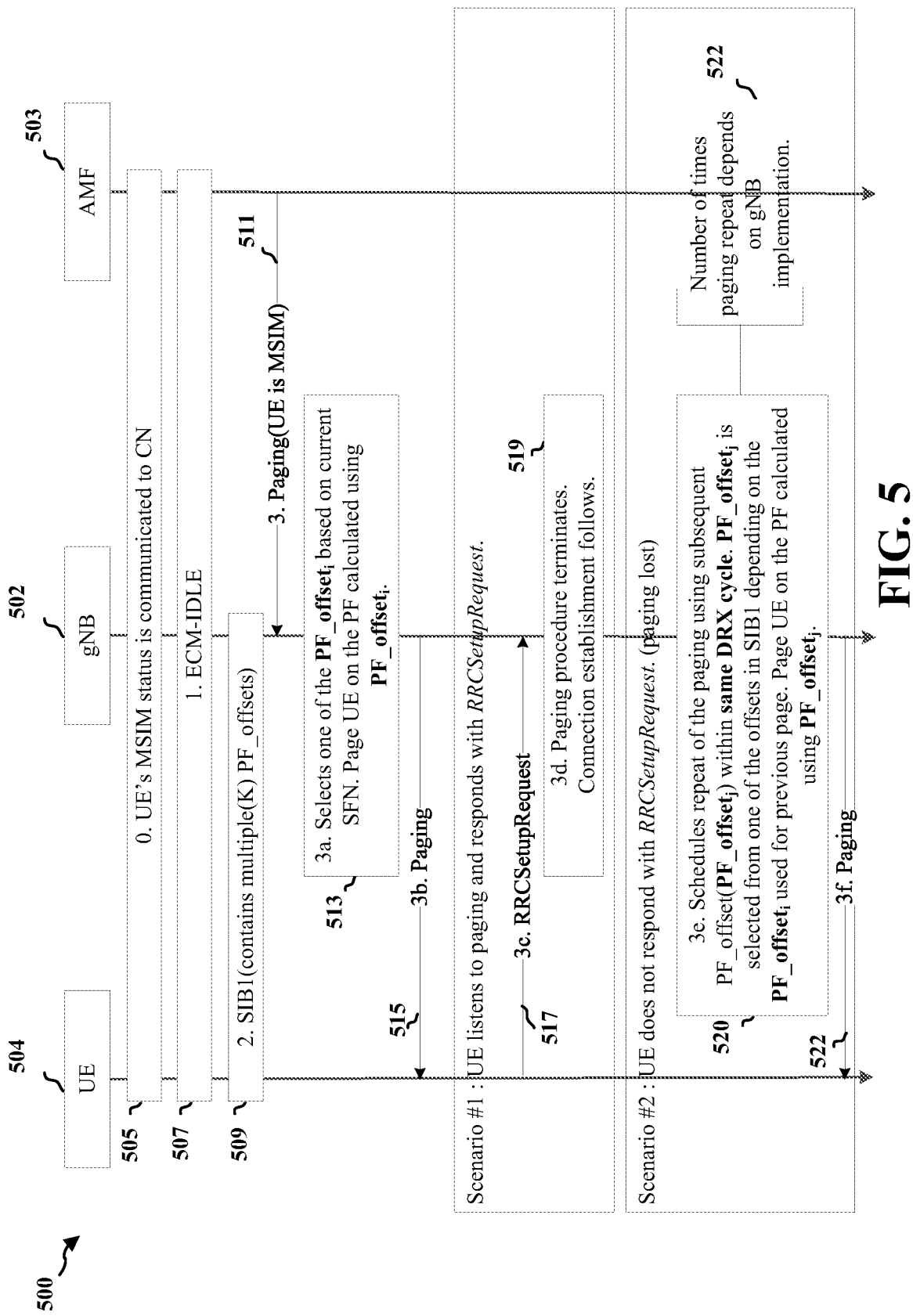
FIG. 5 is a diagram illustrating an example of another design to address the problems of persistent PO collisions for a multi-SIM/USIM UE.

FIG. 5 is a diagram 500 illustrating an example with aspects to address the problems of persistent PO collisions for a multi-SIM/USIM UE. In some aspects, a base station 502 can informed of a multi-SIM/USIM status of a UE 504. The UE 504 may send information indicating that the UE 504 is a multi-SIM/USIM UE having multiple subscriptions with multiple operator networks. The information indicating the UE 504 supports multiple subscriber modules may allow the base station 502 to determine how often and/or how many times to repeat the paging message, instead of blindly repeating the paging message. In this way, the precision and efficiency of paging communication may be enhanced. This example may include modifications of the example discussed above.

As shown in FIG. 5, the UE 504 may send a capability message 505, to the base station 502 and the AMF 503 in core network, indicating that the UE 504 supports multiple subscriber modules in a DRX mode. For example, the capability message 505 may indicate that the UE 504 is a multi-SIM (MSIM) UE.

At 507, the UE 504 may be in a DRX cycle of a DRX mode. The UE may be in an Evolved Packet System Connection Management (ECM)—IDLE state. In the DRX cycle of the DRX mode, the UE 504 may perform periodic listening to a DL paging channel to detect whether there is a paging message for the UE 504. The base station 502 may schedule a paging message in a PO of a PF in a DRX cycle. For example, the PO and/or PF may be determined based on the SFN, the selected PF offset, the length of the DRX cycle, or any combination thereof, e.g., as described in connection with FIG. 4.

At 509, the base station 502 may broadcast a set of PF offsets including multiple (K) PF offsets to the UE 504 in a SIB (e.g., SIB1). For example, the PF offsets may be separated by a pseudo-randomly selected number of radio frames. As an example, the offsets may be prime numbers (e.g., 3, 5, 7, 11, 13, 17), so that the PFs are offset from one another by a prime number.

At 511, the AMF 503 may send the paging message to the base station 502 based on the capability message 505 indicating that the UE 504 is a MSIM UE.

At 513, the base station 502 may select a PF offset, which is a first PF offset ($PF\_offset_1$), from the set of PF Offsets. The first PF offset may be selected based on a current SFN, a length of the DRX cycle, a quantity of the set of PF offsets, or any combination thereof. The base station 502 may page the UE 504 on a first PF calculated using the first PF offset in the DRX cycle.

The base station 502 may send the paging message 515 to the UE 504 on the first PF (e.g., 3b) in the DRX cycle. The first PF of the UE may be determined based on the SFN, the selected PF offset, the length of the DRX cycle, or any combination thereof.

In a first scenario, the UE 504 may listen to the paging message and respond with an RRC setup request message 517. The UE 504 may send the RRC setup request message 517 to the base station 502. At 519, a paging procedure terminates based on the RRC setup request message 517. Then, a connection may be established between the UE 504 and the base station 502.

In a second scenario, the UE 504 does not respond with the RRC setup request message 517. For example, the UE 504 may tune to a conflicting PO of another subscription and the first paging message may be lost.

At 520, in response to the UE not responding with the RRC setup request message, the base station may schedule at least one retransmission of the paging message using a subsequent PF offset ($PF\_offset_j$) within the same DRX cycle. The subsequent PF offset ($PF\_offset_j$) may be selected from one of the set of PF offsets in the SIB, depending on the first PF offset ($PF\_offset_1$) used for the previous paging process. The subsequent PF offset ($PF\_offset_j$) may be different than the first PF offset ($PF\_offset_1$). The base station 502 may repeat the paging message 515 on a subsequent PF determined based on the subsequent PF offset ($PF\_offset_j$) within the same DRX cycle if the UE 504 is multi-SIM/USIM UE and the UE 504 doesn't respond to the paging message 515 on a first PO of the first PF (e.g., a default PO of a default PF). If the UE 504 is multi-SIM/USIM UE and the UE 504 doesn't respond to the paging message 515, the base station 502 may page the UE 504 multiple times on multiple PFs with multiple PF offsets within the same DRX cycle.

At 522, the base station 502 may determine a number of times to repeat the paging message 515 within the same DRX cycle. The number of times to repeat the paging message within the same DRX cycle duration may be an implementation choice (e.g., of the base station 502).

Figure 6:
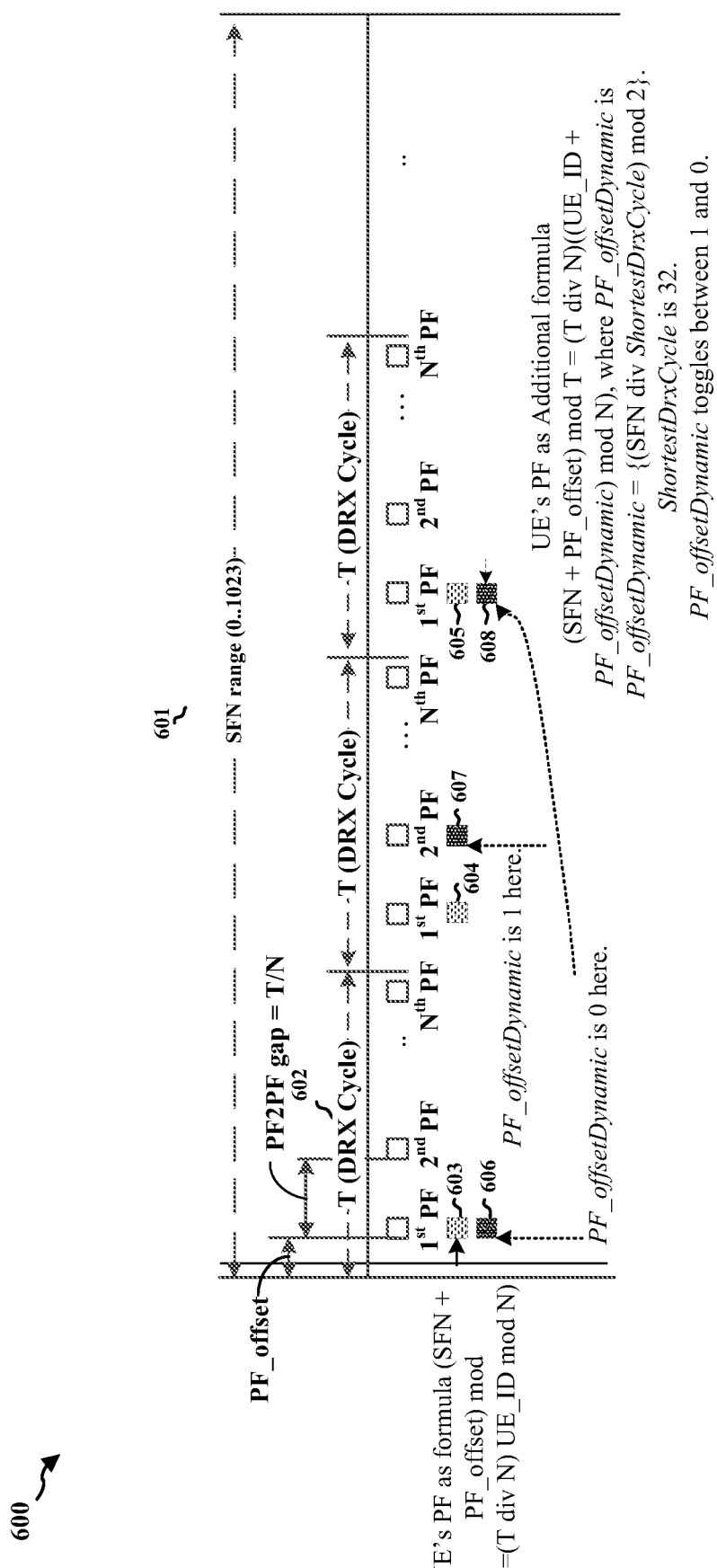
FIG. 6 is a diagram illustrating an example of yet another design to address the problems of persistent PO collisions for a multi-SIM/USIM UE.

FIG. 6 is a diagram 600 illustrating another example including aspects to address the problems of persistent PO collisions for a multi-SIM/USIM UE. In this design, the base station may shift a PF of a UE within a single DRX cycle by a dynamic PF offset (e.g., PF_offsetDynamic). The dynamic PF offset may be cell-specific and may be determined by the base station using a running SFN 601. For example, the dynamic PF offset may be determined based on at least one of the SFN 601, a length of the DRX cycle 602, an identity of the UE, a shortest DRX cycle length, a cell identity, or any combination thereof.

As an example, the dynamic PF offset may be determined by:

$$PF\_offsetDynamic=\{(SFN\ div\ ShortestDrxCycle)\ mod\ 2\}$$

The Modulo 2 operation in the above formula is merely an example for illustration purposes. The operation can be a Modulo X operation, where X can be any integer number between 2 and (N−1), and where N is a number of paging frames in a DRX cycle.

As an example, a reference PF (e.g., 603, 604, 605) may be determined by:

$$(SFN+PF\_offset)mod\ T=(T\ div\ N)*(UE\_ID\ mod\ N)$$

The dynamically shifted PF may be randomized, for example, the dynamically shifted PF may be pseudo-randomly determined. As an example, the dynamically shifted PF (e.g., 606, 607, 608) may be determined by:

$$(SFN+PF\_offset)mod\ T=(T\ div\ N)*\{(UE\_ID+PF\_offsetDynamic)mod\ N\}$$

As shown in FIG. 6, as an example, when the shortest DRX cycle length is 32, the dynamic PF offset may toggle between 1 and 0. In a first DRX cycle, the UE may read the paging message at a first PF 606, which is modified from a first reference PF 603 with a first dynamic PF offset of 0. In a second DRX cycle, the UE may read the paging message at a second PF 607, which is modified from a second reference PF 604 with a second dynamic PF offset of 1. In a third DRX cycle, the UE may read the paging message at a third PF 608, which is modified from a third reference PF 605 with a third dynamic PF offset of 0. In this way, the first PF, the second PF, and/or the third PF may be different. The UE may read the paging message on different PFs in different DRX cycles. Thus, if the UE has a conflicting PO with another subscription at the first DRX cycle, the UE may not have conflicting POs with the other subscription at the subsequent DRX cycles because of the dynamically shifted PF offsets in the subsequent DRX cycles. Therefore, the frequency with which POs of one subscription conflict with POs of the other subscription may be reduced.

In addition to dynamically offsetting the PF, the dynamic PF offset start value may further be seeded depending on the cell identity (e.g., CellIdentity) to further reduce the probability of two cells starting with a same PF offset pattern. For example, the dynamic PF offset may be determined by;

$$PF\_offsetDynamic=[\{(SFN\ div\ ShortestDrxCycle)+(CellIdentity\ mod\ 2)\}\ mod\ 2]$$

The Modulo 2 operation in the above formula is merely an example to illustrate the concept. The operation can be a Modulo X operation, where X can be any integer number between 2 and (N−1).

As a result, the PF may be dynamically shifted from a default or normal position depending on an SFN range within which the default/normal PF is to be broadcasted. In general, on an average, the UE may listen to a PF once in a DRX cycle (T).

The dynamic shifting of a PF with an offset may be either used only for MSIM UEs or may be used for both single SIM and MSIM type of UEs.

In another design to address the problems of persistent PO collisions for a multi-SIM/USIM UE, the base station may pseudo-randomly select a PO from available POs within a PF. This design may be applicable only to scenarios where more than one PO is configured within the PF by the base station.

For example, in every DRX cycle, the base station may select a PO from a set of available (K) POs within a selected PF. The selected PO location may be indicated as a relative index of the PO. The relative index of the selected PO may be determined based on an SFN, a length of a DRX cycle T, a quantity of the set of POs within the PF, or a combination thereof. As an example, the relative index of the selected PO may be determined by SelectedPO-Idx=(SFN div T) mod K, where T is DRX cycle length and SelectedPO-Idx is the relative index of POs available within the PF. A first PO within the PF may be at a first location with an index 0, a second PO within the PF may be at a second location with an index 1, and so forth.

The UE may listen for the paging message on the selected PO in a DRX cycle. In a next DRX cycle, the base station may select another PO. The UE may determine the same other PO and may listen for the paging message on the other selected PO in the next DRX cycle. Because the POs are pseudo-randomly selected from the available POs within the PF, POs that persistently conflict with POs of another subscription may be avoided.

In still another design to address the problems of persistent PO collisions for a multi-SIM/USIM UE, the base station may define multiple PO offsets for a single PO and pseudo-randomly select a PO offset. The base station may define more than one (e.g., K) PO Offsets in a SIB (e.g., SIB1). The base station may select a PO offset (SelectedPO-Offset) from the set of available (K) PO offsets in the SIB.

The PO offset may be selected based on at least one of an SFN, a length of the DRX cycle T, a quantity of the set of PF offsets, or any combination thereof. As an example, the selected PO offset for the Kth DRX cycle may be determined by:

SelectedPO-Offset=(SFN div T) mod K, where T is a length of a DRX cycle, and K is the quantity of the set of PF offsets, e.g., 1<=K<=the quantity of the set of PF offsets.

There may be many ways for the base station to pseudo-randomly select a PO offset. The above examples are merely for illustration, not for limiting the scope of the present disclosure.

The UE may apply the selected PO offset (SelectedPO-Offset), which is modified from a default PO derived according to the current standards, to listen to the paging message in an offset PO during a DRX cycle. In a next DRX cycle, the base station may select another PO offset for another offset PO in which the paging message is to be sent during the next DRX cycle. Because the set of PO offsets may be pseudo-randomly selected, conflicts with POs of another subscription may be reduced.

In yet another design to address the problems of persistent PO collisions for a multi-SIM/USIM UE, the base station may pseudo-randomly change a length of a DRX cycle for a UE. The base station may use a scaled up or a scaled down DRX cycle length (T') for sending a paging message for a UE. For example, if a default DRX cycle length is T, then the base station may use a sequence of scaled T (i.e. T') as T/2, 2T, T/2, etc. The AMF/MME may directly control activation/deactivation of scaling of the DRX cycle length depending on the single SIM (SSIM)/MSIM capability of a UE.

Figure 7:
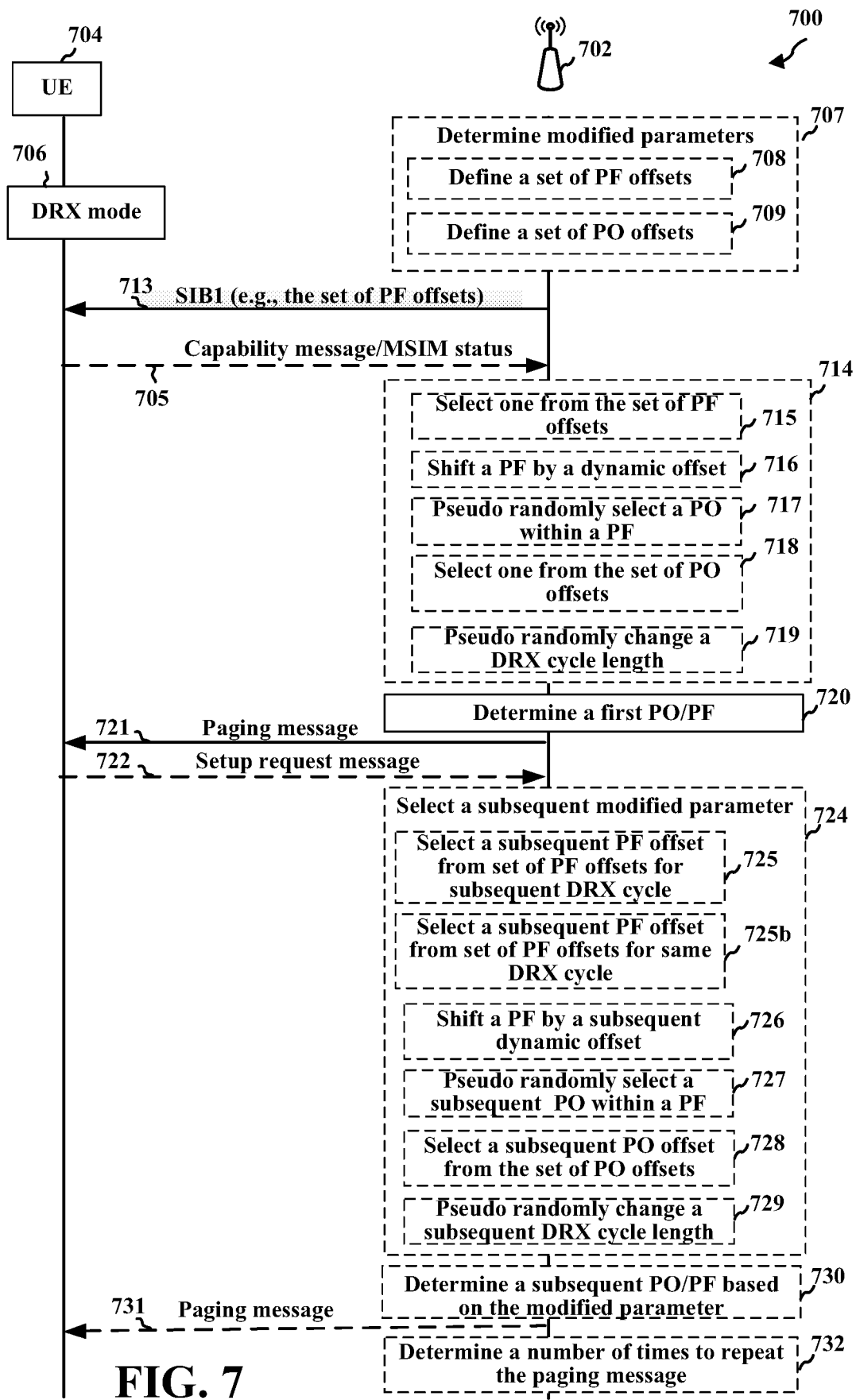
FIG. 7 is a flow diagram illustrating examples of designs to address the problems of persistent PO collisions.

FIG. 7 is a flow diagram 700 illustrating examples of designs to address the problems of persistent PO collisions in wireless communications between a UE 704 (e.g., 104, 504) and a base station 702 (e.g., 102/180, 502). In the examples, the modified parameters of PF and/or PO may be randomized and/or dynamically shifted from default parameters of PO and/or PF. In this way, if the UE 704 misses the paging message at a first time, the UE 704 may be less likely to miss the paging message when retransmitted at a subsequent time. Thus, the probability of persistent PF/PO collision among the registered subscriptions of the UE 704 may be reduced. In addition, the variation in paging reception delay in the scenario of PF/PO collision may also be reduced because the probability of the UE not receiving the paging message on a paging channel may be reduced. Furthermore, the reliability of the paging procedure may be increased by reducing the amount of lost paging messages. The reliability of the paging procedure may be increased without any significant increase in signaling load on the operator network.

At 706, the UE 704 may be in the DRX mode. In a DRX cycle of the DRX mode, the UE 704 may perform periodic listening to a DL paging channel to detect whether there is a paging message for the UE. The base station 702 may schedule a paging message on a first PF/PO in the DRX cycle.

At 707, the base station may determine one or more parameters modified from default parameters associated with the first PO/PF for the UE 704.

At 708, for example, the one or more modified parameters may include a set of PF offsets (e.g., 401, 402, 403, etc.) in a SIB (e.g., SIB1), as described in connection with FIG. 4. For example, the PF of the UE may be determined based on the SFN, a selected PF offset from the set of PF offsets, the length of the DRX cycle, or any combination thereof. For example, the PF offsets may be separated by a pseudo-randomly selected number of radio frames. As an example, the offsets may be prime numbers, thereby separating each of the PFs by a prime number (3, 5, 7, 11, 13, 17) of radio frames.

At 709, for example, the base station may determine a set of PO offsets in the SIB (e.g., SIB1). For example, the base station may define multiple PO offsets for a single PO and pseudo-randomly select a PO offset. The base station may define more than one (K) PO offset in the SIB. The base station may select a PO offset (SelectedPO-Offset) from the set of available (K) PO offsets in the SIB.

The base station 702 may broadcast one or more parameters modified from default parameters associated with the first PO/PF to the UE 704 in the SIB 713. For example, the base station 702 may broadcast the set of PF offsets including multiple PF offsets to the UE 704 in the SIB. For another example, the base station 702 may broadcast the set of PO offsets including multiple PO offsets to the UE 704 in SIB 713.

As shown in FIG. 7, the UE 704 may send a capability message 705, to the base station 702, indicating that the UE 704 supports multiple subscriber modules in a DRX mode. For example, the capability message 705 may indicate the UE 704 is an MSIM UE.

At 714, the base station 702 may select one or more parameters associated with the first PO/PF, which may be modified from a default parameter.

At 715, as an example, the base station 702 may select a first PF offset from the set of PF Offsets. The first PF offset may be selected based on an SFN, a length of the DRX cycle, a quantity of the set of PF offsets, or any combination thereof. The base station 502 may page the UE 504 on a first PF calculated using the first PF offset in a first DRX cycle.

At 716, as another example, the base station 702 may shift a PF of the UE 704 within a single DRX cycle by a dynamic PF offset (e.g., PF_offsetDynamic). The dynamic PF offset may be cell-specific and may be determined by the base station 702 using a running SFN 601. For example, the dynamic PF offset may be determined based on at least one of the SFN 601, a length of the DRX cycle 602, an identity of the UE 704, a shortest DRX cycle length, a cell identity, or any combination thereof.

At 717, in yet another example, in every DRX cycle, the base station 702 may select a first PO from a set of available (K) POs within a selected PF. The first PO may include a location (e.g., a set of time/frequency resources on which a paging message is carried), and the selected first PO location may be indicated as a relative index The relative index of the selected PO may be determined based on a SFN, a length of a DRX cycle T, a quantity of the set of POs within the PF, or a combination thereof. As an example, the relative index of the selected PO may be determined by SelectedPO-Idx=(SFN div T) mod K, where T is DRX cycle length and SelectedPO-Idx is the relative index of a corresponding PO available within the PF. A first PO within the PF may be at a first location with an index 0, a second PO within the PF may be at a second location with an index 1, and so forth.

At 718, in still another example, the base station 702 may define multiple PO offsets for a single PO and pseudo-randomly select a PO offset. The base station 702 may define more than one PO Offsets in the SIB. The base station may select a first PO offset (SelectedPO-Offset) from the set of available PO offsets in the SIB. The selected first PO offset may be based on at least one of an SFN, a length of the DRX cycle T, a quantity of the set of PF offsets, or any combination thereof.

At 719, for example, the base station 702 may use a scaled up or scaled down DRX cycle length (T') for sending a paging message for a UE. For example, if a default DRX cycle length is T, then the base station 702 may use a sequence of a scaled T (i.e. T') as T/2, 2T, T/2, etc.

At 720, the base station 702 may determine the first PF/PO based on the one or more modified parameters. The one or more modified parameter may be selected according to the operations described above (e.g., 715, 716, 717, 718, and/or 719). For example, the first PF may be determined based on the SFN, the selected PF offset, the length of the DRX cycle, or any combination thereof. Referring back to FIG. 4, as an example, the PF of the UE may be determined by: (SFN+SelectedOffset) mod T=(T div N)(UE_ID mod N), where SelectedOffset is one of the set of PF offsets (e.g., 401, 402, 403, etc.) broadcasted in the SIB.

At 721, the base station 702 may send the paging message to the UE 704 on the first PO/PF during the first DRX cycle.

In a first scenario, the UE 704 may listen for the paging message and respond with an RRC setup request message 722 based on receiving the paging message. The UE 704 may send the RRC setup request message 722 to the base station 702. Then, the paging procedure between the base station 702 and the UE 704 may terminate, and connection establishment between the base station 702 and the UE 704 may follow.

In a second scenario, the UE 704 does not respond to the paging message with the RRC setup request message 722. For example, the UE 704 may tune to a conflicting PO of another subscription and the paging message from the base station 702 may be lost.

At 724, the base station 702 may select a subsequent modified parameter associated with a subsequent PO/PF. For example, the base station 702 may select the subsequent modified parameter based on not receiving the RRC setup request message 722.

At 725, as an example, the base station 702 may schedule repetitions of the paging message using a subsequent PF offset for a subsequent DRX cycle. In some aspects, the base station may use different PF offsets in every DRX cycle. In this way, even if two DRX cycles have a same duration, the UE 704 may be less likely to have persistent conflicting POs with another subscription at a corresponding time because the PF offsets for the two DRX cycles are different. Because the first PF offset 401 and the second PF offset 402 may be shifted or randomized, if the UE 704 misses the first paging message at the first DRX cycle 411, the UE 704 may not persistently miss the first paging message at one or more subsequent DRX cycles (e.g., 412, 413). Thus, the UE 704 may avoid missing the first paging message persistently at a same corresponding time in the first DRX cycle 411 and the one or more subsequent DRX cycles (e.g., 412, 413). Therefore, the probability of persistent conflicting POs for the UE 704 may be reduced.

At 725b, as another example, the base station 702 may schedule repetitions of the paging message using a subsequent PF offset for the same DRX cycle. The subsequent PF offset may be selected from the set of PF offsets in the SIB, depending on the first PF offset (PF_offset$_1$) used for the previous paging process. The subsequent PF offset (PF_offset$_j$) may be different than the first PF offset (PF_offset$_1$). The base station 702 may repeat the paging message on a subsequent PF determined based on the subsequent PF offset (PF_offset$_j$) within the same DRX cycle, if the UE 704 is a multi-SIM/USIM UE and the UE 704 doesn't respond to the paging message 721 on a first PO/PF.

At 726, as another example, the base station 702 may schedule repetitions of the paging message using a subsequent dynamic PF offset for a subsequent DRX cycle. For example, the dynamic PF offset may be cell-specific and may be determined by the base station 702 using a running SFN. For example, the dynamic PF offset may be determined based on at least one of the SFN, a length of the DRX cycle, an identity of the UE 704, a shortest DRX cycle length, a cell identity, or any combination thereof.

At 727, as yet another example, the base station 702 may schedule repetitions of the paging message using a subsequent PO (e.g., including a location) from the set of available POs within the PF. For example, the base station 702 may select a subsequent PO from the set of available POs within the PF. The selected PO location may be indicated as a relative index of the subsequent PO. The relative index of the selected subsequent PO may be determined based on an SFN, a length of a DRX cycle T, a quantity of the set of POs within the PF, or a combination thereof.

At 728, as still another example, the base station 702 may schedule repetitions of the paging message using a subsequent PO offset from the set of available PO offsets. For example, the base station 702 may pseudo-randomly select the subsequent PO offset from the set of PO offsets. The selected PO offset may be based on at least one of an SFN, a length of the DRX cycle T, a quantity of the set of PF offsets, or any combination thereof.

At 729, for example, the base station 702 may schedule repetitions of the paging message using a subsequent scaled up or scaled down DRX cycle length (T'). For example, the base station 702 may use the subsequent scaled up or scaled down DRX cycle length (T') for resending the paging message to the UE 704.

At 730, the base station 702 may determine the subsequent PF/PO based on the modified parameter. The subsequent modified parameter may be selected according to the operations described above (e.g., 725, 725b, 726, 727, 728, or 729). For example, the base station 702 may schedule repetitions of the paging message using the subsequent PF offset for the subsequent DRX cycle.

At 731, the base station 702 may resend the paging message to the UE 704 on the subsequent PO of the subsequent PF in the subsequent DRX cycle or in the same DRX cycle.

At 732, the base station 702 may determine a number of times to repeat the paging message. For example, the base station 702 may determine the number of times to repeat the paging message in multiple DRX cycles. For another example, the base station 702 may determine the number of times to repeat the paging message in the same DRX cycle. The number of times to repeat the paging message may be an implementation choice of the base station 702.

Figure 8:
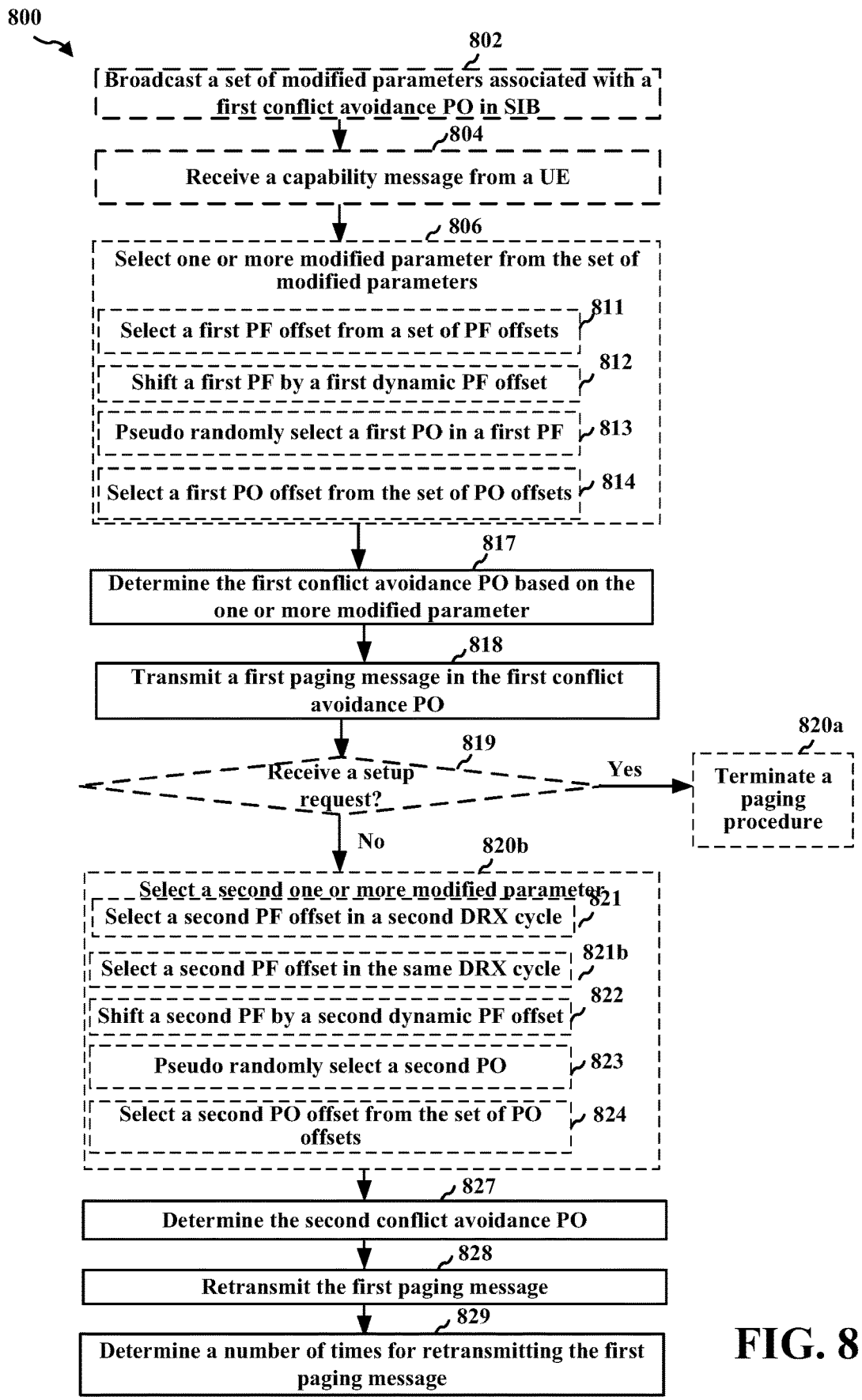
FIG. 8 is a flowchart of a method of wireless communication.

FIG. 8 is a flowchart 800 of a method of wireless communication. The method may be performed by a base station (e.g., the base station 102/180, 502, 702, the apparatus 902/902', the processing system 1014, which may include the memory 376 and which may be the entire apparatus 902/902' or a component of the apparatus 902/902', such as the TX processor 316, the RX processor 370, and/or the controller/processor 375) communicating with a UE, for example, a MSIM UE (e.g., the UE 104, 504, 704, 950; the apparatus 1202/1202'; the processing system 1314, which may include the memory 360 and which may be the entire apparatus 1202/1202' or a component of the apparatus 1202/1202', such as the TX processor 368, the RX processor 356, and/or the controller/processor 359). The wireless communication may comprise 5G/NR, and/or LTE communication. To facilitate an understanding of the techniques and concepts described herein, the method of flowchart 800 may be discussed with reference to the examples illustrated in FIGS. 4-7. Optional aspects may be illustrated in dashed lines. In the method, the parameters associated with a first conflict avoidance PO may be modified from a default parameter. In this way, if the UE 704 misses the paging message at a first time, the UE 704 may be less likely to miss the paging message when retransmitted at a subsequent time. Thus, the probability of persistent PF/PO collision among the registered subscriptions of the UE 704 may be reduced. In addition, the variation in paging reception delay in the scenario of PF/PO collision may also be reduced because the probability of the UE not receiving the paging message on a paging channel may be reduced. Furthermore, the reliability of the paging procedure may be increased by reducing the amount of lost paging messages. The reliability of the paging procedure may be increased without any significant increase in signaling load on the operator network At 802, the base station may broadcast one or more parameters, e.g., a set of modified parameters, associated with a first conflict avoidance PO in SIB to the UE. For example, 802 may be performed by a SIB component 908 from FIG. 9. As an example, referring to FIGS. 4-7, the base station may broadcast a set of PF offsets (e.g., 401, 402, 403, etc.) in a SIB (e.g., SIB1), as described in connection with FIG. 4. For example, the PF of the UE may be determined based on the SFN, a selected PF offset from the set of PF offsets, the length of the DRX cycle, or any combination thereof. For example, the base station 702 may broadcast the set of PF offsets including multiple PF offsets to the UE 704 in the SIB (e.g., SIB1). For example, the set of PF offsets are each separated by a pseudo-randomly selected number of radio frames. As an example, the offsets may be prime numbers, thereby separating each of the PFs by a prime number (3, 5, 7, 11, 13, 17) of radio frames. For another example, the base station 702 may broadcast the set of PO offsets including multiple PO offsets to the UE 704 in the SIB (e.g., SIB1) 713.

At 804, the base station may receive a capability message from the UE indicating that the UE supports the multiple subscriber modules in a DRX mode. For example, 902 may be performed by a reception component 904 from FIG. 9. For example, referring to FIGS. 4-7, the UE 704 may send a capability message 705, to the base station 702, indicating that the UE 704 supports multiple subscriber modules in a DRX mode. For example, the capability message 705 may indicate the UE 704 is an MSIM UE. In a DRX cycle of the DRX mode, the UE 704 may perform periodic listening to a DL paging channel to detect whether there is a paging message for the UE.

At 806, the base station may select one or more modified parameter associated with the first conflict avoidance PO from the set of modified parameters. For example, 806 may be performed by a selection component 910 from FIG. 9. For example, referring to FIGS. 4-7, at 714, the base station 702 may select one or more parameters associated with the first PO/PF which may be modified from a default parameter.

At 811, the base station may select, for the UE, a first PF offset from the set of PF offsets. As an example, the one or more modified parameters may include at least the first PF offset modified from the default PF offset. For example, 811 may be performed by a selection component 910 from FIG. 9. For example, referring to FIGS. 4-7, at 715, the base station 702 may select a first PF offset from the set of PF Offsets. The first PF offset may be selected based on an SFN, a length of the DRX cycle, a quantity of the set of PF offsets, or any combination thereof. The base station 502 may page the UE 504 on a first PF calculated using the first PF offset in a first DRX cycle.

At 812, the base station may dynamically shift the PF of the UE by a first PF offset in a first DRX cycle. As another example, the one or more modified parameters may include at least the first PF offset dynamically shifted from a default PF offset. For example, 812 may be performed by a selection component 910 from FIG. 9. For example, referring to FIGS. 4-7, at 716, the base station 702 may shift a PF of a UE within a single DRX cycle by a dynamic PF offset (e.g., PF_offsetDynamic). The dynamic PF offset may be cell-specific and may be determined by the base station using a running SFN 601. For example, the dynamic PF offset may be determined based on at least one of the SFN 601, a length of the DRX cycle 602, an identity of the UE, a shortest DRX cycle length, a cell identity, or any combination thereof.

At 813, the base station may pseudo-randomly select a first location of the first conflict avoidance PO from a set of locations within a PF. As yet another example, the one or more modified parameters may include at least the first location of the first conflict avoidance PO from a set of locations within a PF. For example, 813 may be performed by a selection component 910 from FIG. 9. For example, referring to FIGS. 4-7, at 717, in every DRX cycle, the base station 702 may select a first PO from a set of available (K) POs within a selected PF. The first PO may include a location (e.g., a set of time/frequency resources on which a paging message is carried), and the selected first PO location may be indicated as a relative index of the PO. The relative index of the selected PO may be determined based on an SFN, a length of a DRX cycle T, a quantity of the set of POs within the PF, or a combination thereof. As an example, the relative index of the selected PO may be determined by SelectedPO-Idx=(SFN div T) mod K, where T is DRX cycle length and SelectedPO-Idx is the relative index of POs available within the PF. A first PO within the PF may be at a first location with an index 0, a second PO within the PF may be at a second location with an index 1, and so forth.

At 814, the base station may select, for the UE, a first PO offset from the set of PO offsets. As still another example, the one or more modified parameters may include at least the first PO offset modified from a default PO offset. For example, 814 may be performed by a selection component 910 from FIG. 9. For example, referring to FIGS. 4-7, at 718, for example, the base station 702 may select a first PO offset (SelectedPO-Offset) from the set of available PO offsets in the SIB (e.g., SIB1). The selected first PO offset may be based on at least one of an SFN, a length of the DRX cycle T, a quantity of the set of PF offsets, or any combination thereof.

At 817, the base station may determine the first conflict avoidance PO based on the one or more modified parameters associated with the first conflict avoidance PO. For example, 817 may be performed by a conflict avoidance PO component 912 from FIG. 9. For example, referring to FIGS. 4-7, at 720, the base station 702 may determine the first PF/PO based on the one or more modified parameters. The one or more modified parameter may be selected according to the operations described above (e.g., 715, 716, 717, 718, and/or 719). For example, the one or more modified parameters may include at least the first PF offset modified from the default PF offset. For example, the first PF may be determined based on the SFN, the selected PF offset, the length of the DRX cycle, or any combination thereof. Referring back to FIG. 4, as an example, the PF of the UE may be determined by: (SFN+SelectedOffset) mod T=(T div N)(UE_ID mod N), where SelectedOffset is one of the set of PF offsets (e.g., 401, 402, 403, etc.) broadcasted in SIB1.

At 818, the base station may transmit a first paging message in the first conflict avoidance PO to the UE in the first DRX cycle. For example, 818 may be performed by a paging message component 914, via a transmission component 906, from FIG. 9. For example, referring to FIGS. 4-7, at 721, the base station 702 may send the paging message to the UE 704 on the first PO/PF in the first DRX cycle.

At 819, the base station may determine whether a setup request responsive to the first paging message is received from the UE. For example, 819 may be performed by a determination component 916 from FIG. 9. For example, referring to FIGS. 4-7, in a first scenario, the UE 704 may listen for the paging message and respond with an RRC setup request message 722. The UE 704 may send the RRC setup request message 722 to the base station 702. In a second scenario, the UE 704 does not respond with the RRC setup request message 722. For example, the UE 704 may tune to a conflicting PO of another subscription and the paging message from the base station 702 may be lost.

At 820a, the base station may terminate the paging procedure between the base station 702 and the UE 704 upon determining that the setup request responsive to the first paging message is received from the UE, and connection establishment between the base station 702 and the UE 704 may follow. For example, 820a may be performed by the determination component 916 from FIG. 9. For example, referring to FIGS. 4-7, the UE 704 may send the RRC setup request message 722 to the base station 702. Then, the paging procedure between the base station 702 and the UE 704 may terminate, and connection establishment between the base station 702 and the UE 704 may follow.

At 820b, the base station may select a second modified parameter from the set of modified parameters upon determining that the setup request responsive to the first paging message is unreceived from the UE, wherein the second modified parameter is different than the first modified parameter. For example, 820b may be performed by the selection component 910 from FIG. 9. For example, referring to FIGS. 4-7, at 724, the base station 702 may select a subsequent modified parameter associated with a subsequent PO/PF.

At 821, as an example, the base station may select a second PF offset from the set of PF offsets, wherein the second PF offset is different than the first PF offset. For example, 821 may be performed by the selection component 910 from FIG. 9. For example, referring to FIGS. 4-7, at 725, for example, the base station 702 may schedule repetitions of the paging message using a subsequent PF offset for a subsequent DRX cycle. In some aspects, the base station may use different PF offsets in every DRX cycle. In this way, even if two DRX cycles have a same duration, the UE 704 may be less likely to have persistent conflicting POs with another subscription at a corresponding time because the PF offsets for the two DRX cycles are different. Because the first PF offset 401 and the second PF offset 402 may be shifted or randomized, if the UE 704 misses the first paging message at the first DRX cycle 411, the UE 704 may not persistently miss the first paging message at one or more subsequent DRX cycles (e.g., 412, 413). Thus, the UE 704 may avoid missing the first paging message persistently at a same corresponding time in the first DRX cycle 411 and the one or more subsequent DRX cycles (e.g., 412, 413). Therefore, the probability of persistent conflicting POs for the UE 704 may be reduced.

At 821b, as another example, the base station may select a second PF offset from the set of PF offsets, wherein the second PF offset is different than the first PF offset. For example, 821*b* may be performed by the selection component 910 from FIG. 9. For example, referring to FIGS. 4-7, at 725*b*, the base station 702 may schedule repetitions of the paging message using a subsequent PF offset for the same DRX cycle. The subsequent PF offset may be selected from one of the set of PF offsets in the SIB (e.g., SIB1), depending on the first PF offset (PF_offset$_1$) used for the previous paging process. The subsequent PF offset (PF_offset$_j$) may be different than the first PF offset (PF_offset$_1$). The base station 702 may repeat the paging message on a subsequent PF determined based on the subsequent PF offset (PF_offset$_j$) within the same DRX cycle, only if the UE 704 is a multi-SIM/USIM UE and the UE 704 doesn't respond to the paging message 721 on a first PO/PF.

At 822, as yet another example, the base station may select a second dynamically shifted PF offset from a default PF offset, wherein the second dynamically shifted PF offset is different than the first dynamically shifted PF offset. For example, 822 may be performed by the selection component 910 from FIG. 9. For example, referring to FIGS. 4-7, at 726, the base station 702 may schedule repetitions of the paging message using a subsequent dynamic PF offset for a subsequent DRX cycle. For example, the dynamic PF offset may be cell-specific and may be determined by the base station 702 using a running SFN. For example, the dynamic PF offset may be determined based on at least one of the SFN, a length of the DRX cycle, an identity of the UE 704, a shortest DRX cycle length, a cell identity, or any combination thereof.

At 823, as still another example, the base station may pseudo-randomly select a second location of the conflict avoidance PO from the set of locations within the PF, wherein the second location is different than the first location. For example, 823 may be performed by the selection component 910 from FIG. 9. For example, referring to FIGS. 4-7, at 727, the base station 702 may schedule repetitions of the paging message using a subsequent PO (e.g., including a location) from the set of available POs within the PF. For example, the base station 702 may select a subsequent PO from the set of available POs within the PF. The selected PO location may be indicated as a relative index of the subsequent PO. The relative index of the selected subsequent PO may be determined based on an SFN, a length of a DRX cycle T, a quantity of the set of POs within the PF, or a combination thereof.

At 824, as another example, the base station may select, for the UE, a second PO offset from the set of PO offsets, wherein the second PO offset is different than the first PO offset. For example, 824 may be performed by the selection component 910 from FIG. 9. For example, referring to FIGS. 4-7, at 728, the base station 702 may schedule repetitions of the paging message using a subsequent PO offset from the set of available PO offsets. For example, the base station 702 may pseudo-randomly select the subsequent PO offset from the set of PO offsets. The selected PO offset may be based on at least one of an SFN, a length of the DRX cycle T, a quantity of the set of PF offsets, or any combination thereof.

At 827, the base station may determine the second conflict avoidance PO based on the second modified parameter associated with the second conflict avoidance PO. For example, 827 may be performed by a conflict avoidance PO component 912 from FIG. 9. For example, referring to FIGS. 4-7, if the setup request message is not received from the UE, the UE may be paged on a second PO/PF 406 of the UE at a second DRX cycle 412. In the case that the UE doesn't respond to the first paging message, the base station may repeat the first paging message in a next DRX cycle while selecting a second PF offset 402 from the set of available PF offsets (e.g., 401, 402, 403, etc.) in the SIB (e.g., SIB1). The base station may resend the first paging message in the second PO/PF 406 of the UE in the second DRX cycle 412, with the second PF offset 402. For example, at 730, the base station 702 may determine the subsequent PF/PO based on the modified parameter. For example, the second PF may be determined based on the SFN, the second selected PF offset, the length of the DRX cycle, or any combination thereof. For example, the base station 702 may schedule repetitions of the paging message using the subsequent PF offset for the subsequent DRX cycle.

At 828, the base station may retransmit a first paging message in the second conflict avoidance PO to the UE. For example, 828 may be performed by the paging message component 914, via the transmission component 906, from FIG. 9. For example, referring to FIGS. 4-7, at 731, the base station 702 may resending the paging message to the UE 704 on the subsequent PF, in the subsequent DRX cycle or in the same DRX cycle.

At 829, the base station may determine a number of times for retransmitting the first paging message. For example, 829 may be performed by a Number component 918 from FIG. 9. For example, referring to FIGS. 4-7, at 732, the base station 702 may determine a number of times to repeat the paging message. The number of times to repeat the paging message is a base station implementation choice. For example, the base station 702 may determine the number of times to repeat the paging message in multiple DRX cycles, as describe in connection with FIG. 4. For another example, the base station 702 may determine the number of times to repeat the paging message in the same DRX cycles, as describe in connection with FIG. 5. The base station 502 may repeat the paging message 515 on a subsequent PF determined based on the subsequent PF offset (PF_offset$_j$) within the same DRX cycle, only if the UE 504 is multi-SIM/USIM UE and the UE 504 doesn't respond to the paging message 515 on a first schedule (default). If the UE 504 is multi-SIM/USIM UE and the UE 504 doesn't respond to the paging message 515, the base station 502 may page the UE 504 multiple times on multiple PFs with multiple PF offsets within the same DRX cycle.

Figure 9:
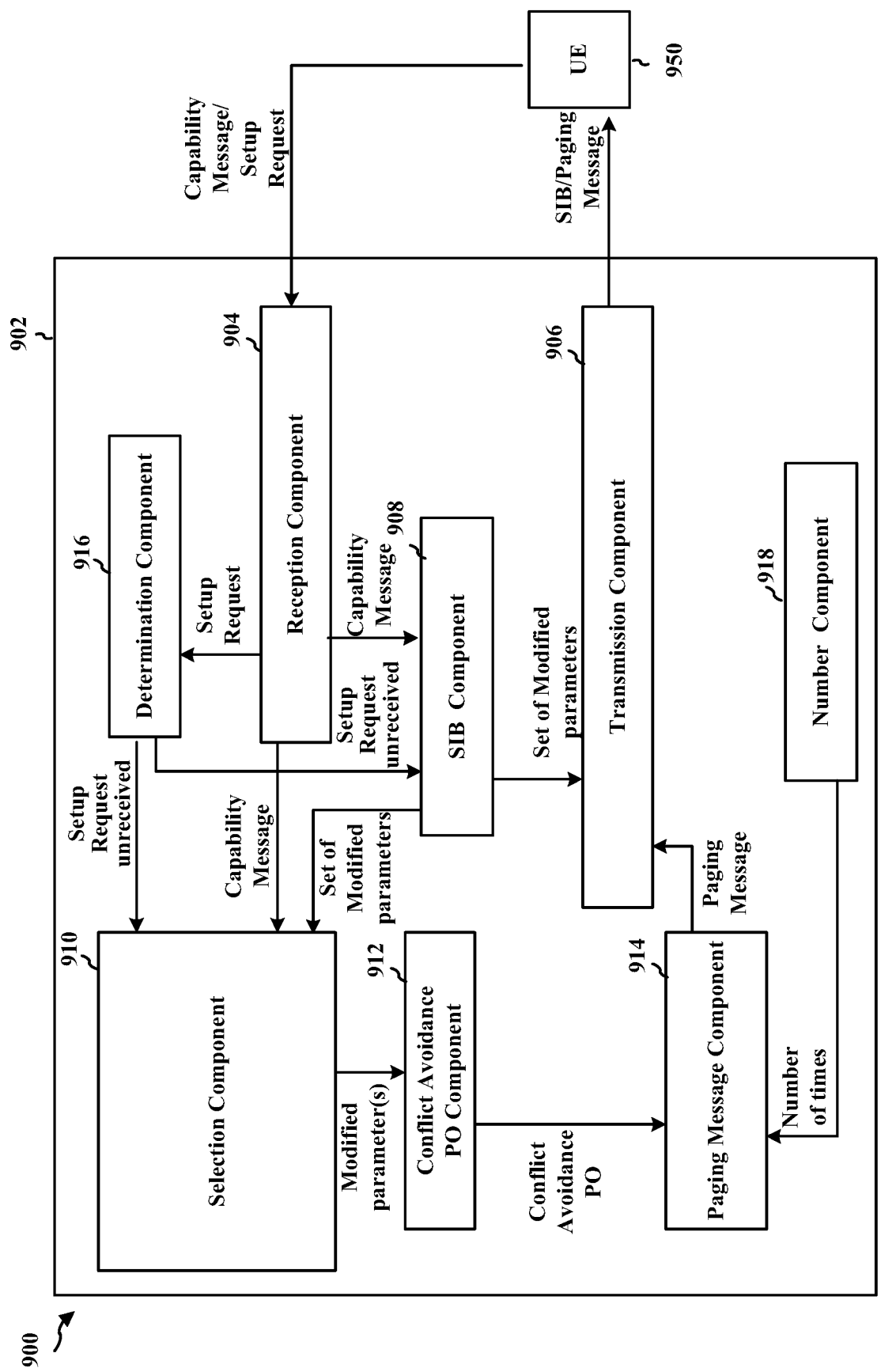
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a base station (e.g., the base station 102/180, 502, 702, the apparatus 902/902', the processing system 1014, which may include the memory 376 and which may be the entire base station 902/902' or a component of the base station 902/902', such as the TX processor 316, the RX processor 370, and/or the controller/processor 375). The apparatus includes a reception component 904 that is configured to receive a capability message from the UE indicating that the UE supports the multiple subscriber modules in a DRX mode, e.g., as described in connection with 804 in FIG. 8. The apparatus includes a SIB component 908 that is configured to broadcast a set of modified parameters associated with a first conflict avoidance PO in SIB to the UE, e.g., as described in connection with 802 in FIG. 8. The apparatus includes a selection component 910 that is configured to select a modified parameter, from the set of modified parameters associated with a conflict avoidance PO, e.g., as described in connection with 806, or 820*b*, in FIG. 8. The apparatus includes a conflict avoidance PO component 912 that is configured to determine the conflict avoidance PO based on one or more modified parameters, e.g., as described in connection with 817, or 827, in FIG. 8. The apparatus includes a paging message component 914 that is configured to transmit, via a transmission component 906, a first paging message in the conflict avoidance PO to the UE, e.g., as described in connection with 818, or 828, in FIG. 8. The apparatus includes a determination component 916 that is configured to determine whether a setup request responsive to the first paging message is received from the UE and terminate a paging procedure upon receiving the setup request, e.g., as described in connection with 819, or 820a, in FIG. 8. The apparatus includes a number component 918 that is configured to determine a number of times for retransmitting the first paging message, e.g., as described in connection with 829 in FIG. 8.

The apparatus may include additional components that perform each of the blocks of the algorithm in the aforementioned flowcharts of FIGS. 4-8. As such, each block in the aforementioned flowcharts of FIGS. 4-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
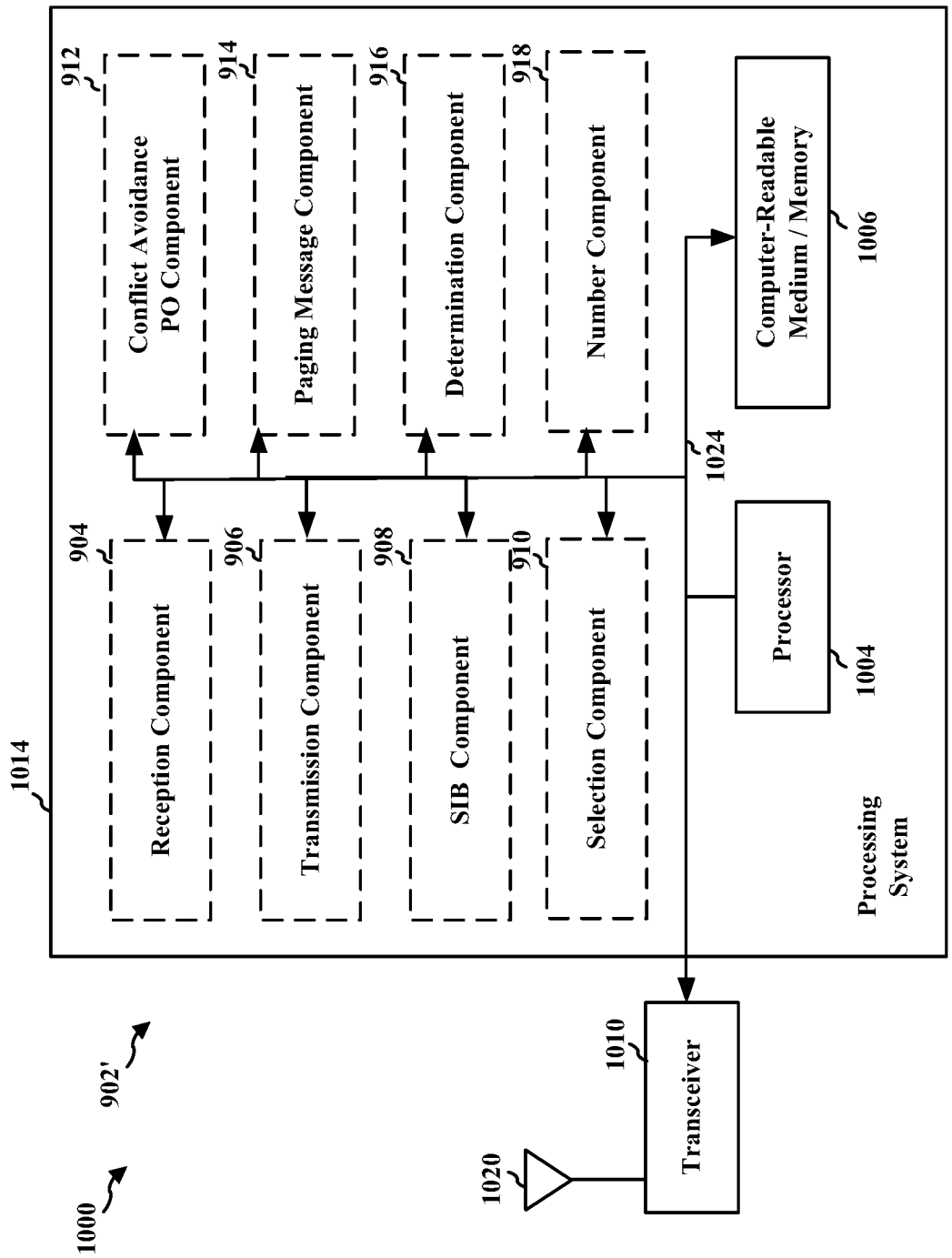
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 906, 908, 910, 912, 914, 916, 918, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 906, 908, 910, 912, 914, 916, 918. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see 310 of FIG. 3).

In one configuration, the apparatus 902/902' for wireless communication includes means for determining a first conflict avoidance PO based on one or more modified parameters associated with the first conflict avoidance PO; and means for transmitting a first paging message in the first conflict avoidance PO to a UE in a first DRX cycle. In one configuration, the apparatus 902/902' may include means for receiving a capability message from the UE indicating that the UE supports the multiple subscriber modules in the DRX mode, wherein the determining the first conflict avoidance PO is based on the capability message indicating the UE supports the multiple subscriber modules in the DRX mode. In one configuration, the apparatus 902/902' may include means for broadcasting a set of PF offsets modified from a default PF offset in a SIB; and means for selecting, for the UE, a first PF offset from the set of PF offsets, wherein the one or more modified parameters include at least the first PF offset modified from the default PF offset, and wherein the first paging message is transmitted in the first conflict avoidance PO to the UE in the first DRX cycle based on the first PF offset.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
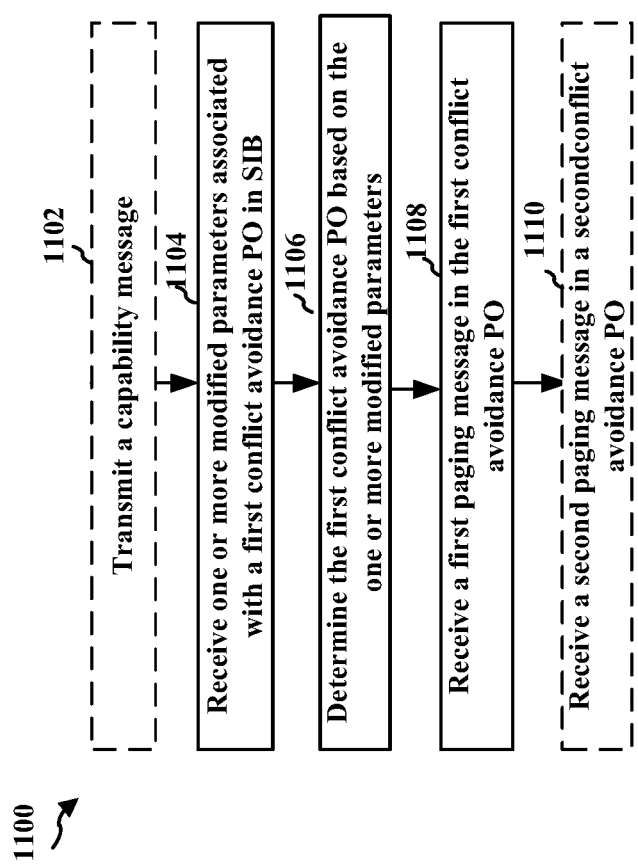
FIG. 11 is a flowchart of a method of wireless communication.

FIG. 11 is a flowchart 1100 of a method of wireless communication. The method may be performed by a UE, for example, a MSIM UE (e.g., the UE 104, 504, 704, 950; the apparatus 1202/1202'; the processing system 1314, which may include the memory 360 and which may be the entire UE 1202/1202' or a component of the UE 1202/1202', such as the TX processor 368, the RX processor 356, and/or the controller/processor 359) communicating with a base station (e.g., the base station 102/180, 502, 702, the apparatus 902/902', the processing system 1014, which may include the memory 376 and which may be the entire base station 902/902' or a component of the base station 902/902', such as the TX processor 316, the RX processor 370, and/or the controller/processor 375). The wireless communication may comprise 5G/NR, and/or LTE communication. To facilitate an understanding of the techniques and concepts described herein, the method of flowchart 1100 may be discussed with reference to the examples illustrated in FIGS. 4-7. Optional aspects may be illustrated in dashed lines. In the method, the parameters associated with a first conflict avoidance PO may be modified from a default parameter. In this way, if the UE 704 misses the paging message at a first time, the UE 704 may be less likely to miss the paging message when retransmitted at a subsequent time. Thus, the probability of persistent PF/PO collision among the registered subscriptions of the UE 704 may be reduced. In addition, the variation in paging reception delay in the scenario of PF/PO collision may also be reduced because the probability of the UE not receiving the paging message on a paging channel may be reduced. Furthermore, the reliability of the paging procedure may be increased by reducing the amount of lost paging messages. The reliability of the paging procedure may be increased without any significant increase in signaling load on the operator network.

At 1102, the UE may transmit a capability message to the base station indicating that the UE supports the multiple subscriber modules in a DRX mode. For example, 1102 may be performed by a capability message component 1208, via a transmission component 1206, from FIG. 12. For example, referring to FIGS. 4-7, the UE 704 may send a capability message 705, to the base station 702, indicating that the UE 704 supports multiple subscriber modules in a DRX mode. For example, the capability message 705 may indicate the UE 704 is an MSIM UE. In a DRX cycle of the DRX mode, the UE 704 may perform periodic listening to a DL paging channel to detect whether there is a paging message for the UE.

At 1104, the UE may receive one or more parameters, e.g., a set of modified parameters, associated with a first conflict avoidance PO in SIB from the base station. For example, 1104 may be performed by a SIB component 1210, via a reception component 1204, from FIG. 12. As an example, referring to FIGS. 4-7, the UE may receive a set of PF offsets (e.g., 401, 402, 403, etc.) in a SIB (e.g., SIB1), as described in connection with FIG. 4. For example, the base station 702 may broadcast the set of PF offsets including multiple PF offsets to the UE 704 in the SIB (e.g., SIB1). For example, the PF offsets may be separated by a pseudo-randomly selected number of radio frames. As an example, the offsets may be prime numbers, thereby separating each of the PFs by at least a prime number (3, 5, 7, 11, 13, 17) of radio frames apart. For another example, the base station 702 may broadcast the set of PO offsets including multiple PO offsets to the UE 704 in the SIB (e.g., SIB1), 713.

At 1106, the UE may determine the first conflict avoidance PO based on the one or more modified parameters associated with the first conflict avoidance PO. For example, 1106 may be performed by a conflict avoidance PO component 1212 from FIG. 12. For example, referring to FIGS. 4-7, at 720, the base station 702 may determine the first PF/PO based on the one or more modified parameters. For example, the one or more modified parameters may include at least a first PF offset modified from the default PF offset. For example, the first PF may be determined based on the SFN, the selected PF offset, the length of the DRX cycle, or any combination thereof. Referring back to FIG. 4, as an example, the PF of the UE may be determined by: (SFN+ SelectedOffset) mod T=(T div N)(UE_ID mod N), where SelectedOffset is one of the set of PF offsets (e.g., 401, 402, 403, etc.) broadcasted in the SIB (e.g., SIB1).

At 1108, the UE may receive a first paging message in the first conflict avoidance PO from the base station in the first DRX cycle. For example, 1108 may be performed by a paging message component 1214, via a reception component 1204, from FIG. 12. For example, referring to FIGS. 4-7, at 721, the base station 702 may send the paging message to the UE 704 on the first PO/PF in the first DRX cycle.

At 1110, the UE may receive a second paging message in a second conflict avoidance PO to the UE. For example, 1110 may be performed by the paging message component 1214, via the reception component 1204, from FIG. 12. For example, referring to FIGS. 4-7, if the setup request message is not received from the UE, the UE may be paged on a second PO/PF 406 of the UE at a second DRX cycle 412. In the case that the UE doesn't respond to the first paging message, the base station may repeat the first paging message in a next DRX cycle while selecting a second PF offset 402 from the set of available PF offsets (e.g., 401, 402, 403, etc.) in the SIB (e.g., SIB1). The base station may resend the first paging message in the second PO/PF 406 of the UE in the second DRX cycle 412, with the second PF offset 402. For example, at 731, the base station 702 may resending the paging message to the UE 704 on the subsequent PO of the subsequent PF, in the subsequent DRX cycle or in the same DRX cycle.

Figure 12:
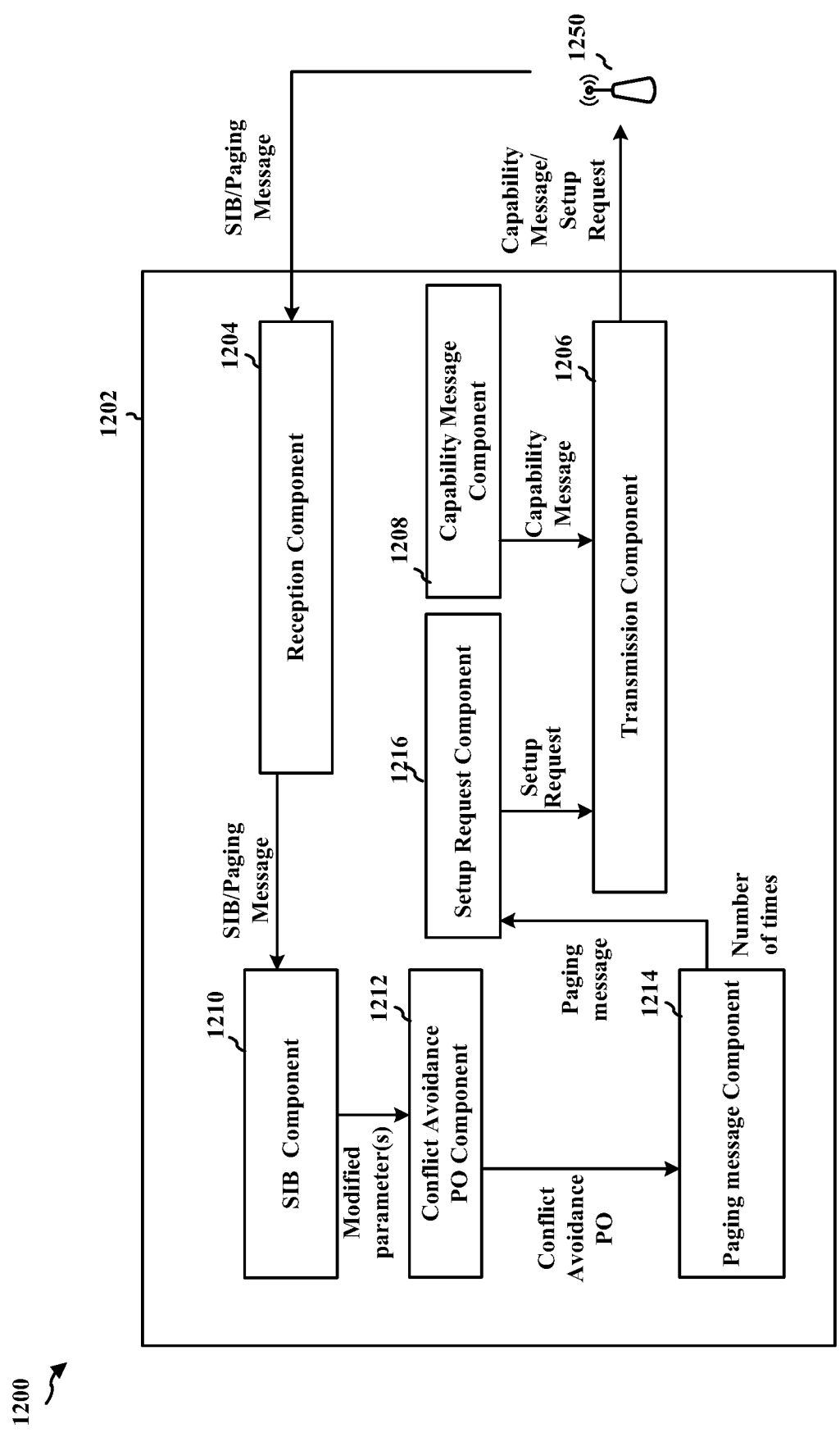
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE, for example, a MSIM UE (e.g., the UE 104, 504, 704, 950; the apparatus 1202/1202'; the processing system 1314, which may include the memory 360 and which may be the entire UE 1202/1202' or a component of the UE 1202/1202', such as the TX processor 368, the RX processor 356, and/or the controller/processor 359). The apparatus includes a capability message component 1208 that is configured to transmit, via a transmission component 1206, a capability message to the base station 1250 indicating that the UE supports the multiple subscriber modules in the DRX mode, e.g., as described in connection with 1102, in FIG. 11. The apparatus includes a SIB component 1210 that is configured to receive, via a reception component 1204, one or more modified parameters associated with a first conflict avoidance PO from the base station, e.g., as described in connection with 1104 in FIG. 11. The apparatus includes a conflict avoidance PO component 1212 that is configured to determine the conflict avoidance PO based on the one or more modified parameters, e.g., as described in connection with 1106 in FIG. 11. The apparatus includes a paging message component 1214 that is configured to receive, via the reception component 1204, a first paging message in the conflict avoidance PO from the base station, e.g., as described in connection with 1108 in FIG. 11. The apparatus includes a setup request component 1216 that is configured to transmit a setup request responsive to the first paging message received from the base station.

The apparatus may include additional components that perform each of the blocks of the algorithm in the aforementioned flowcharts of FIGS. 4-7 and 11. As such, each block in the aforementioned flowcharts of FIGS. 4-7 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
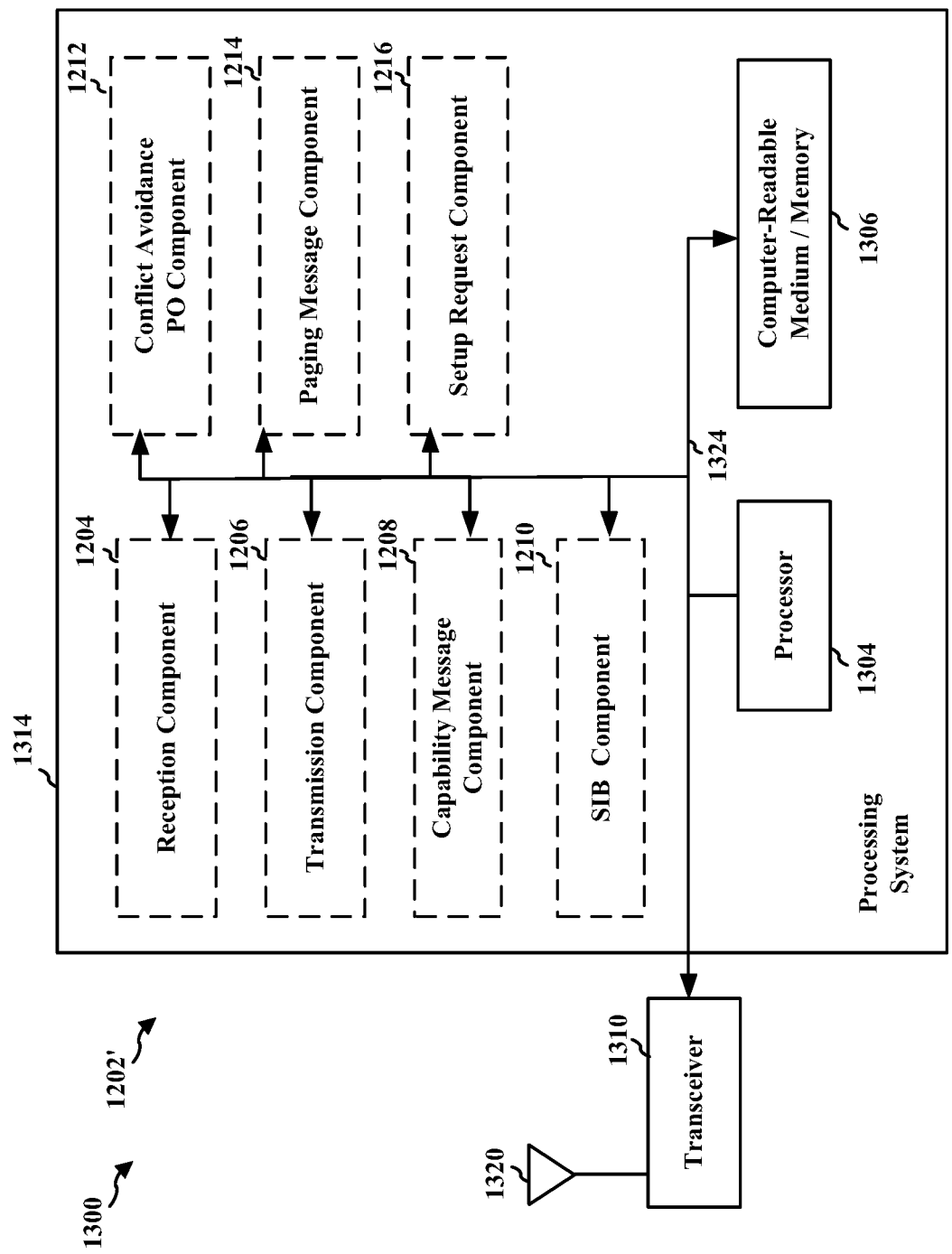
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1004, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1202/1202' for wireless communication includes means for receiving one or more modified parameters associated with a first conflict avoidance PO in a SIB from a base station; means for determining the first conflict avoidance PO based on the one or more modified parameters; and means for receiving a first paging message in the first conflict avoidance PO from the base station in a first DRX cycle. In one configuration, the apparatus 1202/1202' for wireless communication includes means for transmitting a capability message to the base station indicating that the UE supports the multiple subscriber modules in the DRX mode. In one configuration, the apparatus 1202/1202' for wireless communication includes means for receiving, in a second DRX cycle of the UE, a second paging message in a second conflict avoidance PO based on a second PF offset selected from the set of PF offsets.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other embodiments or teaching described herein, without limitation.

Example 1 is a method of wireless communication at a base station, comprising: determining a first conflict avoidance paging occasion (PO) based on one or more modified parameters associated with the first conflict avoidance PO; and transmitting a first paging message in the first conflict avoidance PO to a user equipment (UE) in a first discontinuous reception (DRX) cycle.

In Example 2, the method of Example 1 further includes that the UE supports multiple subscriber modules in a DRX mode associated with the first DRX cycle.

In Example 3, the method of Example 1 or Example 2 further includes receiving a capability message from the UE indicating that the UE supports the multiple subscriber modules in the DRX mode, wherein the determining the first conflict avoidance PO is based on the capability message indicating the UE supports the multiple subscriber modules in the DRX mode.

In Example 4, the method of any of Examples 1-3 further includes broadcasting a set of paging frame (PF) offsets modified from a default PF offset in a system information block (SIB); and selecting, for the UE, a first PF offset from the set of PF offsets, wherein the one or more modified parameters include at least the first PF offset modified from the default PF offset, and wherein the first paging message is transmitted in the first conflict avoidance PO to the UE in the first DRX cycle based on the first PF offset.

In Example 5, the method of any of Examples 1-4 further includes that the set of PF offsets are each separated by a pseudo-randomly selected number of radio frames.

In Example 6, the method of any of Examples 1-5 further includes that the pseudo-randomly selected number of radio frames is a prime number.

In Example 7, the method of any of Examples 1-6 further includes that the first PF offset is selected from the set of PF offsets based on at least one of a system frame number (SFN), a length of the first DRX cycle, a quantity of the set of PF offsets, or any combination thereof.

In Example 8, the method of any of Examples 1-7 further includes determining that a setup request responsive to the first paging message is not received from the UE; selecting, when the setup request is not received, a second PF offset from the set of PF offsets, wherein the second PF offset is different than the first PF offset; determining a second conflict avoidance PO based on the second PF offset modified from the default PF offset; and retransmitting, to the UE in a second DRX cycle, the first paging message in the second conflict avoidance PO based on the second PF offset.

In Example 9, the method of any of Examples 1-8 further includes determining a number of times for retransmitting the first paging message in a set of conflict avoidance POs in multiple DRX cycles; determining the set of conflict avoidance POs based on the set of PF offsets modified from the default PF offset; and retransmitting, to the UE, the first paging message the determined number of times in the set of conflict avoidance POs based on the set of PF offsets in multiple DRX cycles.

In Example 10, the method of any of Examples 1-9 further includes receiving a capability message from the UE indicating that the UE supports multiple subscriber modules in a DRX mode associated with the first DRX cycle.

In Example 11, the method of any of Examples 1-10 further includes determining that a setup request responsive to the first paging message is not received from the UE; selecting, when the setup request is not received and the UE supports the multiple subscriber modules in the DRX mode, a second PF offset from the set of PF offsets, wherein the second PF offset is different than the first PF offset; determining a second conflict avoidance PO based on the second PF offset modified from the default PF offset; and retransmitting the first paging message in the second conflict avoidance PO to the UE in the first DRX cycle based on the second PF offset.

In Example 12, the method of any of Examples 1-11 further includes determining a number of times for retransmitting the first paging message in a set of the conflict avoidance POs in the first DRX cycle; determining the set of conflict avoidance POs based on the set of PF offsets modified from the default PF offset; and retransmitting, to the UE, the first paging message the determined number of times in the set of conflict avoidance POs based on the set of PF offsets in the first DRX cycle.

In Example 13, the method of any of Examples 1-12 further includes that the one or more modified parameters include at least a first paging frame (PF) offset dynamically shifted from a default PF offset, and the method further comprising: dynamically shifting a PF of the UE by the first PF offset in the first DRX cycle, wherein the first paging message is transmitted in the first conflict avoidance PO to the UE in the first DRX cycle based on the first PF offset that is dynamically shifted.

In Example 14, the method of any of Examples 1-13 further includes that the first PF offset is dynamically shifted based on at least one of a system frame number (SFN), a length of the first DRX cycle, an identity of the UE, a shortest DRX cycle length, a cell identity, or any combination thereof.

In Example 15, the method of any of Examples 1-14 further includes pseudo-randomly selecting a first location of the first conflict avoidance PO from a set of locations within a PF, wherein the one or more modified parameters include at least the first location that is pseudo-randomly selected, and wherein the first paging message is transmitted in the first conflict avoidance PO to the UE in the first DRX cycle based on the first location.

In Example 16, the method of any of Examples 1-15 further includes that the first location is pseudo-randomly selected from the set of locations within the PF based on at least one of a system frame number (SFN), a length of the first DRX cycle, a quantity of the set of locations, or any combination thereof.

In Example 17, the method of any of Examples 1-16 further includes broadcasting a set of PO offsets modified from a default PO offset in a system information block (SIB); and selecting, for the UE, a first PO offset from the set of PO offsets, wherein the one or more modified parameters include at least the first PO offset modified from the default PO offset, and wherein the first paging message is transmitted in the first conflict avoidance PO to the UE in the first DRX cycle based on the first PO offset.

In Example 18, the method of any of Examples 1-17 further includes that the first PO offset is selected from the set of PO offsets based on at least one of a system frame number (SFN), a length of the first DRX cycle, a quantity of the set of PO offsets, or any combination thereof.

Example 19 is a device including one or more processors and one or more memories in electronic communication with the one or more processors storing instructions executable by the one or more processors to cause the device to implement a method as in any of Examples 1-18.

Example 20 is a system or apparatus including means for implementing a method or realizing an apparatus as in any of Examples 1-18.

Example 21 is a non-transitory computer readable medium storing instructions executable by one or more processors to cause the one or more processors to implement a method as in any of Examples 1-18.

Example 22 is a method of wireless communication at a user equipment (UE), comprising: receiving one or more modified parameters associated with a first conflict avoidance paging occasion (PO) in a system information block (SIB) from a base station; determining the first conflict avoidance PO based on the one or more modified parameters; and receiving a first paging message in the first conflict avoidance PO from the base station in a first DRX cycle.

In Example 23, the method of Example 22 further includes that the UE supports multiple subscriber modules in a DRX mode associated with the first DRX cycle, the method further comprising: transmitting a capability message to the base station indicating that the UE supports the multiple subscriber modules in the DRX mode.

In Example 24, the method of Example 22 or Example 23 further includes that the one or more modified parameters include at least one of a first paging frame (PF) offset modified from a default PF offset, wherein the first PF offset is selected from a set of PF offsets modified from the default PF offset, and wherein the first paging message is received in the first conflict avoidance PO based on the first PF offset.

In Example 25, the method of any of Example 22-24 further includes that the set of PF offsets are each separated by a pseudo-randomly selected number of radio frames, and wherein the pseudo-randomly selected number of radio frames is a prime number.

In Example 26, the method of any of Example 22-25 further includes that the first PF offset is selected from the set of PF offsets based on at least one of a system frame number (SFN), a length of the first DRX cycle, a quantity of the set of PF offsets, or any combination thereof.

In Example 27, the method of any of Example 22-26 further includes receiving, in a second DRX cycle of the UE, a second paging message in a second conflict avoidance PO based on a second PF offset selected from the set of PF offsets.

In Example 28, the method of any of Example 22-27 further includes transmitting a capability message to the base station indicating that the UE supports multiple subscriber modules in a DRX mode associated with the first DRX cycle, wherein the first paging message is received in the first conflict avoidance PO based on the first PF offset and based on the capability message; and receiving, in the first DRX cycle, a second paging message in a second conflict avoidance PO based on a second PF offset selected from the set of PF offsets.

In Example 29, the method of any of Example 22-28 further includes that the one or more modified parameters include at least a first paging frame (PF) offset dynamically shifted from a default PF offset, and wherein the first paging message is received in the first conflict avoidance PO based on the first PF offset that is dynamically shifted, and wherein the first PF offset is dynamically shifted based on at least one of a system frame number (SFN), a length of the first DRX cycle, an identity of the UE, a shortest DRX cycle length, a cell identity, or any combination thereof.

In Example 30, the method of any of Example 22-29 further includes that the one or more modified parameters include at least a first location of the first conflict avoidance PO pseudo-randomly selected from a set of locations within a PF, and wherein the first paging message is received in the first conflict avoidance PO based on the first location, and wherein the first location is pseudo-randomly selected from the set of locations within the PF based on at least one of a system frame number (SFN), a length of the first DRX cycle, a quantity of the set of locations, or any combination thereof.

In Example 31, the method of any of Example 22-30 further includes that the one or more modified parameters include at least a first PO offset modified from the first default PO offset, and the method further comprising: receiving a set of PO offsets in the SIB, wherein the first PO offset is selected from the set of PO offsets, and wherein the first paging message is received in the first conflict avoidance PO based on the first PO offset, wherein the first PO offset is selected from the set of PO offsets based on at least one of a system frame number (SFN), a length of the first DRX cycle, a quantity of the set of PO offsets, or any combination thereof.

Example 32 is a device including one or more processors and one or more memories in electronic communication with the one or more processors storing instructions executable by the one or more processors to cause the device to implement a method as in any of Examples 22-31.

Example 33 is a system or apparatus including means for implementing a method or realizing an apparatus as in any of Examples 22-31.

Example 34 is a non-transitory computer readable medium storing instructions executable by one or more processors to cause the one or more processors to implement a method as in any of Examples 22-31.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a base station, comprising:
    modifying one or more default parameters associated with a first paging frame (PF) into one or more modified parameters, the one or more modified parameters indicating a set of PF offsets with each PF offset being different from a default PF offset;
    transmitting, to a user equipment (UE), the one or more modified parameters indicating the set of PF offsets;
    receiving, from the UE, a capability message indicating that the UE supports multiple subscriber modules in a discontinuous reception (DRX) mode associated with a first DRX cycle;
    selecting a first PF offset from the set of PF offsets based on at least one of a system frame number (SFN), a length of a DRX cycle, a quantity of the set of PF offsets, or any combination thereof;
    determining a first conflict avoidance paging occasion (PO) within the first PF based on the first PF offset; and
    transmitting, to the UE, a first paging message in the first conflict avoidance PO in the first DRX cycle based on the capability message of the UE.

2. The method of claim 1, wherein the determining the first conflict avoidance PO is further based on the capability message.

3. The method of claim 1, wherein the transmitting the one or more modified parameters comprises broadcasting the set of PF offsets in a system information block (SIB), wherein the first paging message is transmitted in the first conflict avoidance PO based on the first PF offset.

4. The method of claim 1, wherein each PF offset in the set of PF offsets is separated by a pseudo-randomly selected number of radio frames.

5. The method of claim 4, wherein the pseudo-randomly selected number of radio frames is a prime number.

6. The method of claim 1, further comprising:
    determining that a setup request responsive to the first paging message is not received from the UE;
    selecting a second PF offset from the set of PF offsets, wherein the second PF offset is different than the first PF offset;
    determining a second conflict avoidance PO based on the second PF offset; and
    retransmitting, to the UE in a second DRX cycle, the first paging message in the second conflict avoidance PO based on the capability message of the UE.

7. The method of claim 1, further comprising:
    determining a number of times to retransmit the first paging message in a set of conflict avoidance POs in multiple DRX cycles based on the capability message of the UE;
    determining the set of conflict avoidance POs based on the set of PF offsets; and
    retransmitting, to the UE, for each of the number of times to retransmit, the first paging message in the set of conflict avoidance POs based on the set of PF offsets in the multiple DRX cycles.

8. The method of claim 1, further comprising:
determining that a setup request responsive to the first paging message is not received from the UE;
selecting, when the setup request is not received and the UE supports the multiple subscriber modules in the DRX mode, a second PF offset from the set of PF offsets, wherein the second PF offset is different than the first PF offset;
determining a second conflict avoidance PO based on the second PF offset; and
retransmitting the first paging message in the second conflict avoidance PO to the UE in the first DRX cycle based on the capability message of the UE.

9. The method of claim 8, further comprising:
determining a number of times to retransmit the first paging message in a set of the conflict avoidance POs in the first DRX cycle based on the capability message of the UE;
determining the set of conflict avoidance POs based on the set of PF offsets; and
retransmitting, to the UE, for each of the number of times to retransmit, the first paging message in the set of conflict avoidance POs based on the set of PF offsets in the first DRX cycle.

10. The method of claim 1, wherein the selecting comprises selecting a first dynamic PF offset from the set of PF offsets, the first dynamic PF offset being dynamically shifted from the default PF offset, wherein the determining the first conflict avoidance PO comprises dynamically shifting the first PF by the first dynamic PF offset in the first DRX cycle, wherein the first paging message is transmitted in the first conflict avoidance PO to the UE in the first DRX cycle based on the first dynamic PF offset.

11. The method of claim 10, further comprising determining the first dynamic PF offset based on at least one of the system frame number (SFN), the length of the DRX cycle, an identity of the UE, a shortest DRX cycle length, a cell identity, or any combination thereof.

12. The method of claim 1, further comprising:
pseudo-randomly selecting a first location of the first conflict avoidance PO from a set of locations within the first PF, wherein the one or more modified parameters include at least the first location that is pseudo-randomly selected, and wherein the first paging message is transmitted in the first conflict avoidance PO to the UE in the first DRX cycle based on the first location.

13. The method of claim 12, wherein the first location is pseudo-randomly selected from the set of locations within the first PF based on at least one of the SFN, the length of the DRX cycle, a quantity of the set of locations, or any combination thereof.

14. The method of claim 1, wherein the one or more modified parameters comprise a set of paging occasion (PO) offsets with each PO offset being different from a default PO offset, wherein the transmitting the one or more modified parameters comprises broadcasting the set of PO offsets in a system information block (SIB), the method further comprising:
selecting a first PO offset from the set of PO offsets, wherein the first paging message is transmitted in the first conflict avoidance PO to the UE in the first DRX cycle based on the first PO offset.

15. The method of claim 14, wherein the first PO offset is selected from the set of PO offsets based on at least one of the SFN, the length of the DRX cycle, a quantity of the set of PO offsets, or any combination thereof.

16. A method of wireless communication performed by a user equipment (UE), comprising:
receiving, from a base station, one or more modified parameters indicating a set of paging frame (PF) offsets;
determining that the UE supports multiple subscriber modules in a discontinuous reception (DRX) mode associated with a first DRX cycle;
transmitting, to the base station, a capability message indicating that the UE supports the multiple subscriber modules in the DRX mode associated with the first DRX cycle;
determining that a first paging occasion (PO) within a first PF that is offset by a first PF offset of the set of PF offsets in the first DRX cycle is conflicting in time with a second PO based on a monitoring of a first paging message in the first PO, wherein the first PO is associated with a first subscription of a first operator network that corresponds to a first subscriber module supported by the UE and the second PO is associated with a second subscription of a second operator network different from the first operator network, the second operator network corresponding to a second subscriber module supported by the UE; and
receiving, from the base station, the first paging message in one or more retransmissions to the UE within a second PF subsequent to the first PF in the first DRX cycle based on the capability message, wherein the second PF is offset by a second PF offset of the set of PF offsets, the second PF offset being different from the first PF offset.

17. The method of claim 16, wherein the first paging message is received in the first PO based on the first PF offset.

18. The method of claim 16, wherein each PF offset in the set of PF offsets is separated by a pseudo-randomly selected number of radio frames, and wherein the pseudo-randomly selected number of radio frames is a prime number.

19. The method of claim 16, further comprising:
receiving, in a second DRX cycle of the UE, a second paging message in a third PO based on a third PF offset of the set of PF offsets.

20. The method of claim 16, wherein the first paging message is received in the first PO based on the first PF offset and based on the capability message; and
receiving, in the first DRX cycle, a second paging message in a third PO based on a third PF offset of the set of PF offsets.

21. The method of claim 16, wherein the receiving the one or more modified parameters comprises receiving a system information block (SIB) comprising the one or more modified parameters, wherein the one or more modified parameters include at least a first dynamic PF offset based on at least one of a system frame number (SFN), a length of the first DRX cycle, an identity of the UE, a shortest DRX cycle length, a cell identity, or any combination thereof, wherein the first dynamic PF offset is dynamically shifted from a default PF offset, and wherein the first paging message is received in the first PO based on the first dynamic PF offset.

22. The method of claim 16, wherein the receiving the one or more modified parameters comprises receiving a system information block (SIB) comprising the one or more modified parameters, wherein the one or more modified parameters include at least a first location of the first PO within the first PF, and wherein the first paging message is received in the first PO based on the first location, and wherein the first location is pseudo-randomly selected from a set of locations within the first PF based on at least one of a system frame number (SFN), a length of the first DRX cycle, a quantity of the set of locations, or any combination thereof.

23. The method of claim 16, wherein the receiving the one or more modified parameters comprises receiving a system information block (SIB) comprising the one or more modified parameters, wherein the one or more modified parameters include a set of PO offsets with each PO offset being different from a default PO offset, wherein the first paging message is received in the first PO based on a first PO offset of the set of PO offsets, wherein the first PO offset is included in the set of PO offsets based on at least one of a system frame number (SFN), a length of the first DRX cycle, a quantity of the set of PO offsets, or any combination thereof.

24. An apparatus for wireless communication at a base station, comprising:
a memory; and
at least one processor coupled to the memory and configured to:
modify one or more default parameters associated with a first paging frame (PF) into one or more modified parameters, the one or more modified parameters indicating a set of PF offsets with each PF offset being different from a default PF offset;
transmit, to a user equipment (UE), the one or more modified parameters indicating the set of PF offsets;
receive, from the UE, a capability message indicating that the UE supports multiple subscriber modules in a discontinuous reception (DRX) mode associated with a first DRX cycle;
select a first PF offset from the set of PF offsets based on at least one of a system frame number (SFN), a length of a DRX cycle, a quantity of the set of PF offsets, or any combination thereof;
determine a first conflict avoidance paging occasion (PO) based on the first PF offset; and
transmit, to the UE, a first paging message in the first conflict avoidance PO in the first DRX cycle based on the capability message of the UE.

25. An apparatus for wireless communication a user equipment (UE), comprising:
a memory; and
at least one processor coupled to the memory and configured to:
receive, from a base station, one or more modified parameters indicating a set of paging frame (PF) offsets;
determine that the UE supports multiple subscriber modules in a discontinuous reception (DRX) mode associated with a first DRX cycle;
transmit, to the base station, a capability message indicating that the UE supports the multiple subscriber modules in the DRX mode associated with the first DRX cycle;
determining that a first paging occasion (PO) within a first PF that is offset by a first PF offset of the set of PF offsets in the first DRX cycle is conflicting in time with a second PO based on a monitoring of a first paging message in the first PO, wherein the first PO is associated with a first subscription of a first operator network that corresponds to a first subscriber module supported by the UE and the second PO is associated with a second subscription of a second operator network different from the first operator network, the second operator network corresponding to a second subscriber module supported by the UE; and
receive, from the base station, the first paging message in one or more retransmissions to the UE within a second PF subsequent to the first PF in the first DRX cycle based on the capability message, wherein the second PF is offset by a second PF offset of the set of PF offsets, the second PF offset being different from the first PF offset.

* * * * *